United States Patent [19]

Nakagawa

[11] Patent Number: 4,910,783
[45] Date of Patent: Mar. 20, 1990

[54] METHOD AND APPARATUS FOR COMPARING PATTERNS

[75] Inventor: Seiichi Nakagawa, Toyohashi, Japan

[73] Assignee: Matsushita Electric Industrial Co., Ltd., Osaka, Japan

[21] Appl. No.: 183,692

[22] Filed: Apr. 19, 1988

Related U.S. Application Data

[63] Continuation-in-part of Ser. No. 590,694, Mar. 19, 1984, abandoned.

[30] Foreign Application Priority Data

Mar. 22, 1983 [JP] Japan .................................. 58-48600

[51] Int. Cl.$^4$ ............................................... G10L 5/00
[52] U.S. Cl. ..................................................... 381/43
[58] Field of Search ............................................ 381/43

[56] References Cited

U.S. PATENT DOCUMENTS 4,608,708  6/1986  Watanabe ............................... 381/43

Primary Examiner—Emanuel S. Kemeny
Attorney, Agent, or Firm—Joseph W. Farley

[57] ABSTRACT

A method and apparatus for finding, by dynamic programing, combined patterns of standard patterns which are most similar to an input pattern by conducting a comparison collation between the input pattern expressed by a feature vector row and various combined patterns of memorized standard patterns expressed by feature vector rows corresponding to respective units of the words and the like to be recognized. In a dynamic programming calculation apparatus a comparison collation distance between a local pattern of the input pattern and an individual standard pattern is obtained, as a first step, by a method which is independent of a local length of the input pattern. Subsequently, as a second step, the comparison collation distance is converted into a quantity, which is independent of a length of the standard pattern, to obtain a distance between the comparison collation distance and various combined patterns of said standard patterns as a semioptimum value, thereby finding the combined patterns of said standard patterns which are most similar to said input pattern. Since in the dynamic programming calculation for the first step a weighting coefficient is determined so as to be dependent upon merely a standard pattern frame length, the result of a preceding calculation of a distance between vectors can be used in the following calculation, whereby overlapping calculations can be avoided.

7 Claims, 16 Drawing Sheets

FIG. 1
prior art
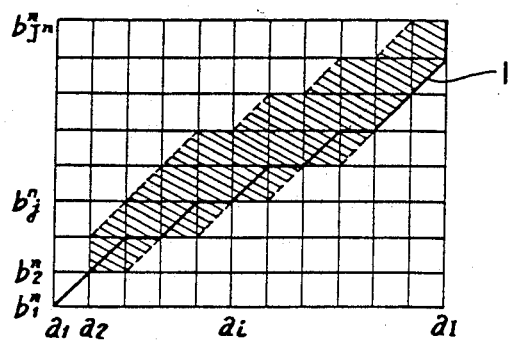
FIG. 2a
prior art
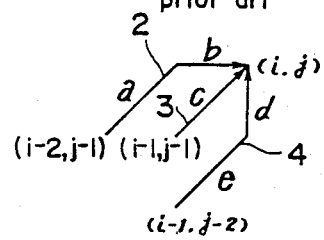
FIG. 2b
prior art
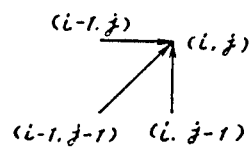
FIG. 2c
prior art
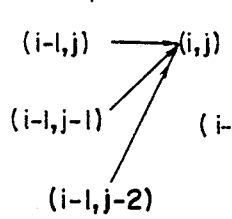
FIG. 2d
prior art
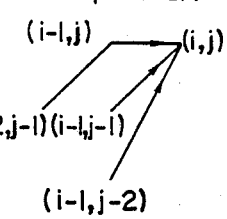
FIG. 2e
prior art
FIG. 2f
prior art
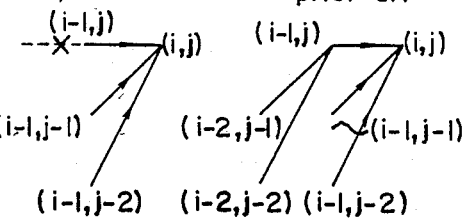
FIG. 2g
prior art
FIG. 2h
prior art
FIG. 2i
prior art
FIG. 2j
prior art
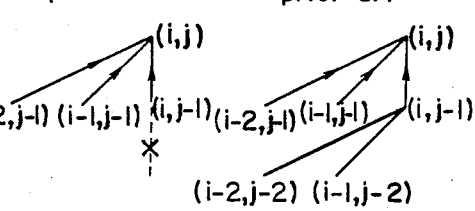

FIG.10A
prior art
FIG.10B
prior art
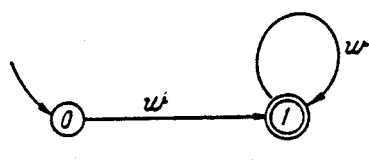
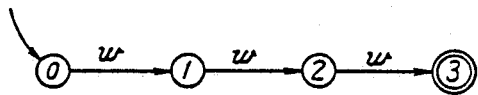
FIG.11a    FIG.11b    FIG.11c    FIG.11d
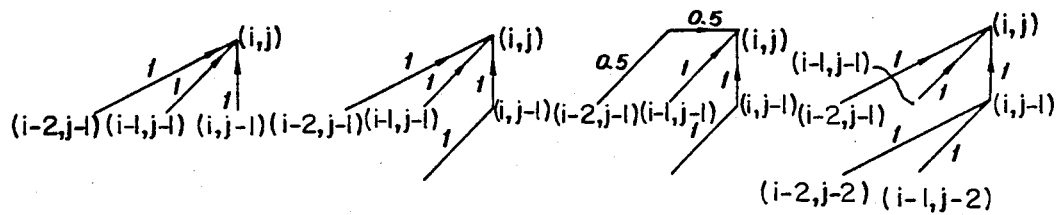
FIG.11e
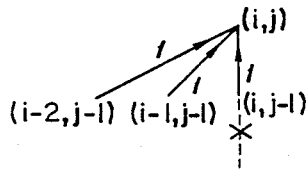
FIG.12
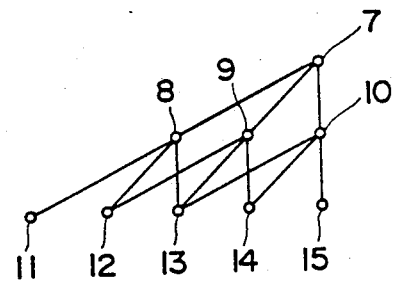

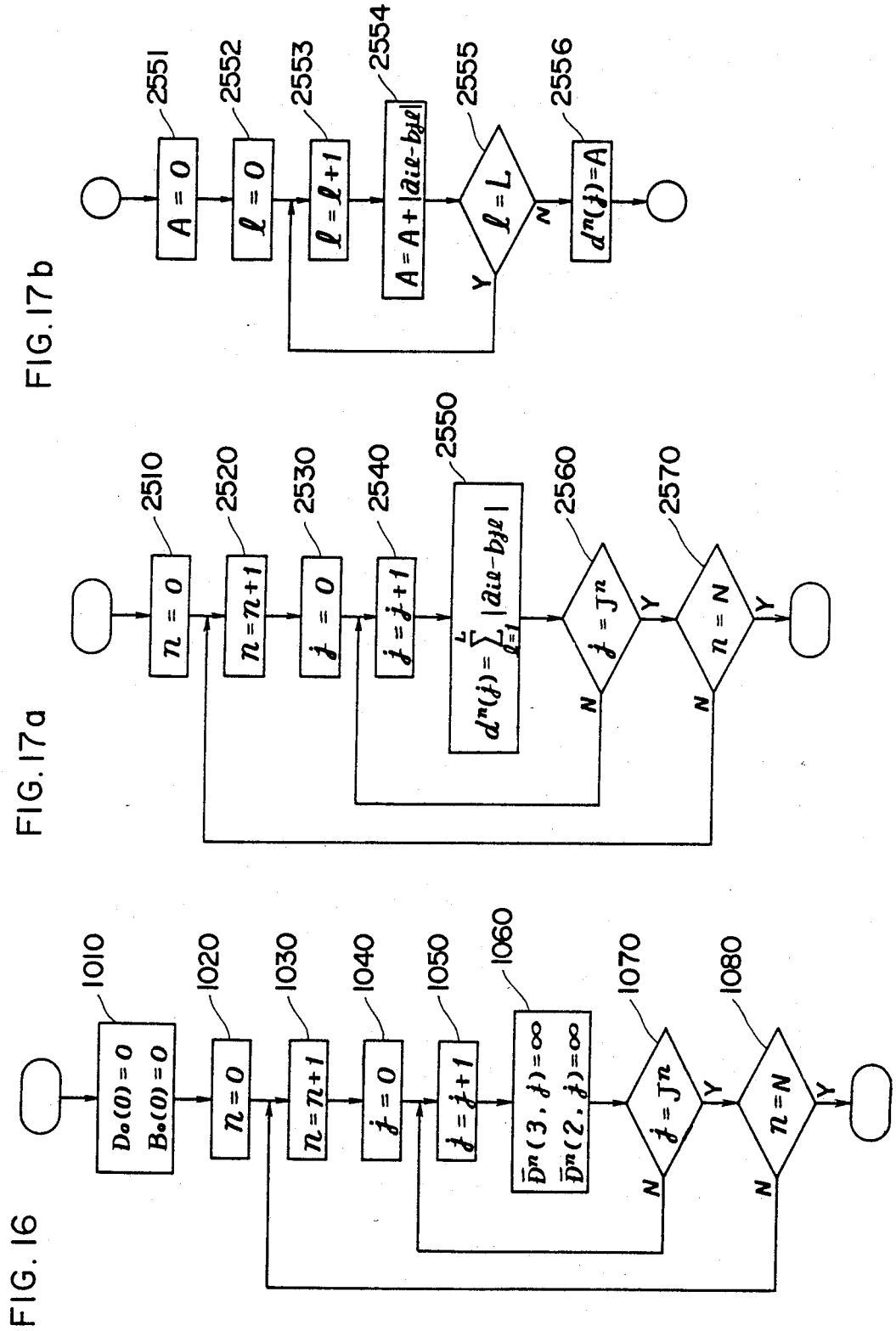

FIG. 18a
FIG. 18b
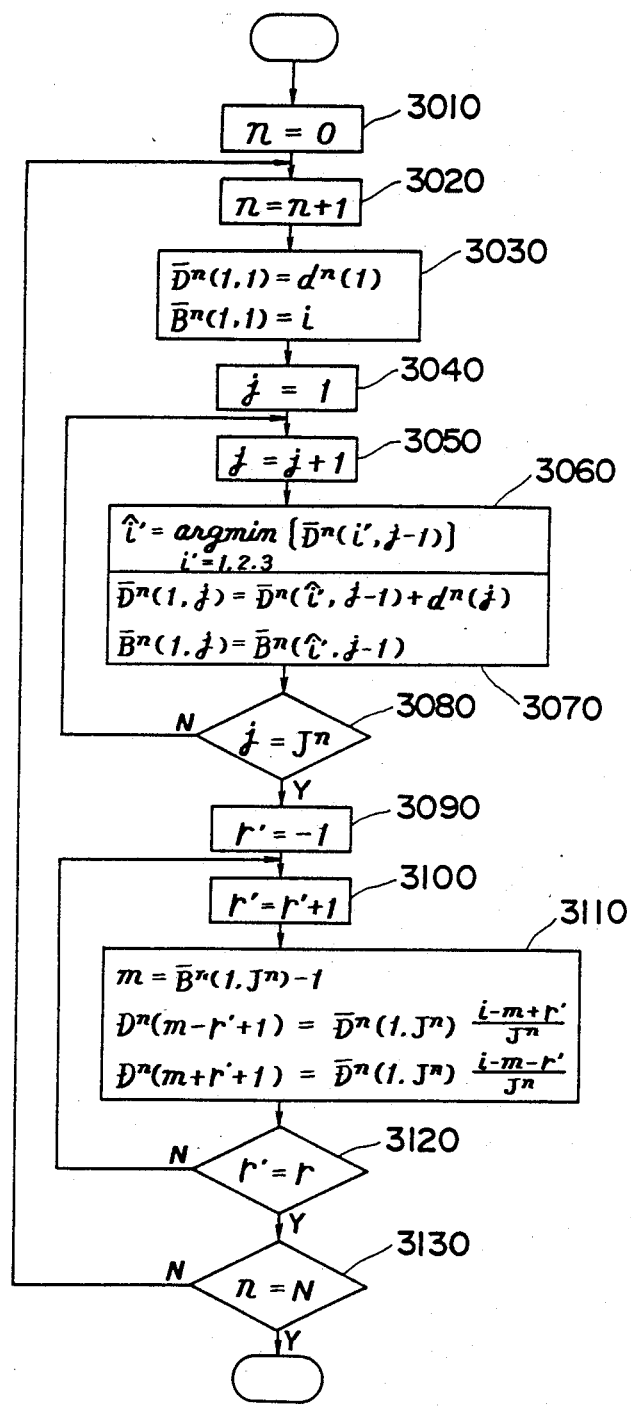
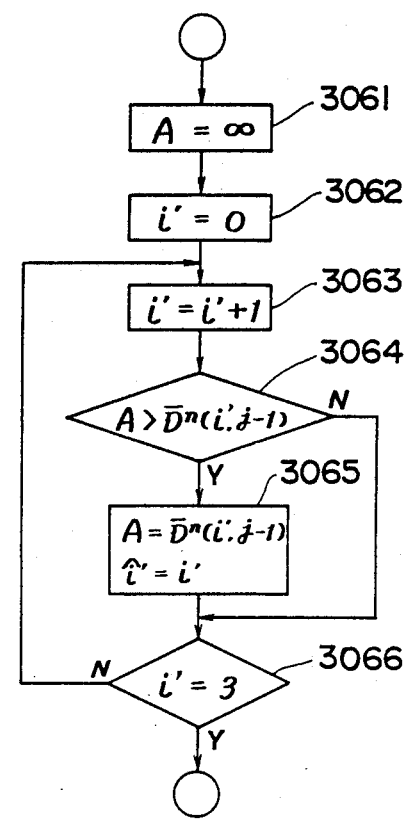

FIG. 20
FIG. 23
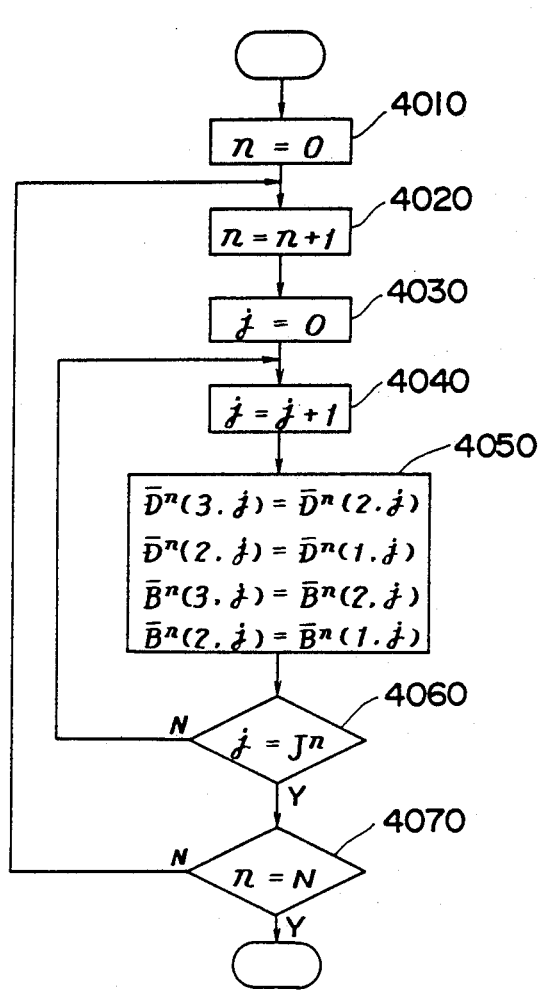
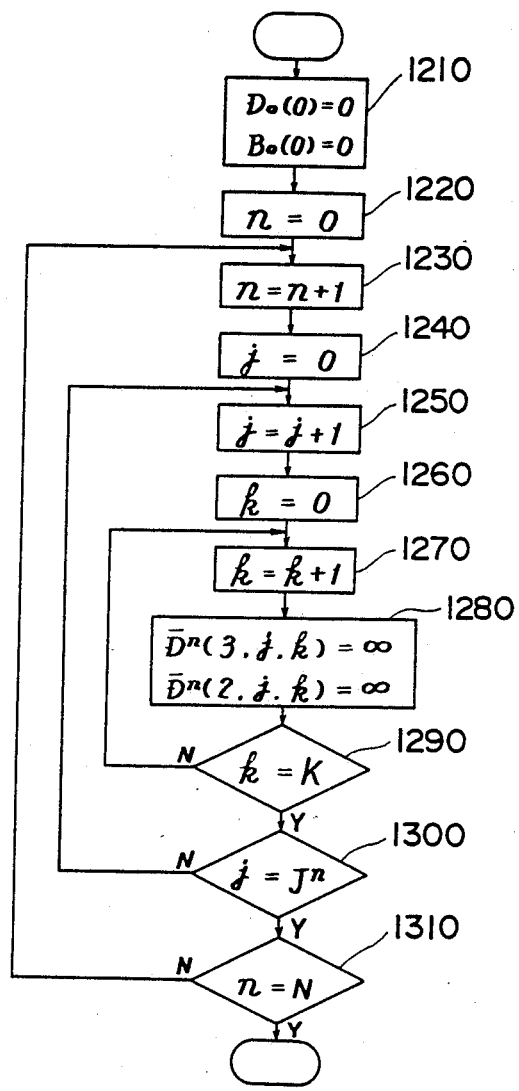

METHOD AND APPARATUS FOR COMPARING PATTERNS

This is a CIP of Ser. No. 06/590,694 filed 3-19-1989, now abandoned.

FIELD OF ART

The present invention relates to a method of and an apparatus for comparing patterns, and more particularly to a method and an apparatus for automatically recognizing the patterns of a continuous speech as a series of patterns.

BACKGROUND OF THE INVENTION

The present invention relates to provide an improved recognition apparatus for a continuous speech or the like by pattern matching using a dynamic programming method (to be hereinafter called DP matching). Hereinafter, recognition of word speech pronounced with pauses to require provision of a pause at a predetermined length or more between the word speeches to be input is called the isolating word speech recognition, while that not required to do so is called the continuous word speech recognition.

Conventionally, the recognition method for the continuous speech by the pattern matching using the dynamic programming method includes, as well-known, a two-level DP matching method (2 level DP method), a level building method (LB method), a clockwise dynamic programming method (CWDP method), and an order n dynamic programming method (O(n) DP method). These methods all register individual patterns corresponding to words to be recognized and couple these patterns most suitably to thereby obtain the combination of said reference registered individual patterns closest to the patterns corresponding to continuous-pronounced input speech of the words, so that the row of the registered patterns of words corresponding to the combined patterns is made as the recognition result. Some methods have been proposed which obtain best combination of the reference pattern regarding (a) the number of the input words is not known (when the information as to the input word number is not used), (b) the same is known (when the information as to the input word number is used), (c) the order of appearance of input words can be represented by automation or the like (when restriction as to the appearance order of the input words is utilized), etc.

One conventional method, however, is surely less in the calculation amount but applicable to the above case (a) only and not applicable to those (b) and (c). Or, another conventional method is applicable to the cases (a) through (c) but [largely] requires large calculation amount or memory. The present invention has been designed to eliminate the above problem, so that the apparatus of the invention is applicable for all the cases (a) through (c) and equivalent to the smallest calculation amount of the conventional example and has a necessity of memory storing amount at the middle between the minimum and the maximum in the conventional example.

In order to understand the present invention, it is necessary to understand what is the pattern matching, how to apply thereto the dynamic programming method, and what condition is required to apply this method. Hence, at first isolated word speech recognition using the DP matching will be described and then the continuous word speech recognition will be described as follows:

The speech recognition apparatus by the pattern matching generally comprises; a feature extracting means for converting input speech signals into a series of feature vectors (input pattern) by a filter bank, Fourier analysis, LPC analysis or the like; a reference pattern memory means for previously registering as the reference pattern regarding all the recognizing words the series of feature vectors (called the reference pattern) extracted by the same means as the feature extracting means from individual word speech as the recognition vocabulary prepronounced; pattern comparing means for computing a similarity or a distance between the input pattern pronounced to be recognized and extracted by the feature extracting means and the reference pattern stored in the reference pattern memory means; and judging means for delivering as the result of recognition the word corresponding to the reference pattern of the highest similarity (of the smallest distance) as a result of the pattern comparison.

In the aforesaid apparatus construction, it is problematical for the pattern matching how to compare the patterns generally different in length (the vector sequence row) and how to define a distance between both the patterns (to be hereinafter described as the distance).

Next, one of solutions for the above will be shown as follows: When the ith feature vector constituting the input pattern T is represented by $a_i$, the number of the feature vectors for T by I, the nth reference pattern is represented by $R^n$, the jth feature vector constituting $R^n$ by $b_j^n$, the total number of the feature vectors constituting $R^n$ by $J^n$, $$T = a_1 a_2 \ldots a_i \ldots a_I \tag{1}$$

$$R^n = b_1^n b_2^n \ldots b_j^n \ldots b_{J^n}^n \tag{2}$$

are put, and a distance between both the patterns is represented by $D(T, R^n)$ the following formula is defined:

$$D(T, R^n) = \min_{c(1) \ldots c(K)} \left[ \left\{ \sum_{k=1}^{K} w(k) \cdot d^n(c(k)) \right\} \Big/ \sum_{k=1}^{K} w(k) \right] \tag{3}$$

where $c(k)$ is a vector meeting a relation $c(k)=(i(k), j(k))$ with respect to $k=1, 2 \ldots K$ and a function relating the feature vector $a_{i(k)}$ of pattern T to the feature vector $b_{j(k)}^n$ of pattern $R^n$. Accordingly, assuming that $a_1$ surely corresponds to $b_1^n$ and $a_I$ to $b_{J^n}^n$, $i(K)=I$ and $j(K)=J^n$ are obtained. $d^n(c(k))=d^n(i(k), j(k))$ represents the distance between the feature vector $a_{i(k)}$ of pattern T and the feature vector $b_{j(k)}^n$ of pattern $R^n$. The definition of the distance between the vectors being variously proposed, it is most simple to use the city block distance. According to the city block distance, when $$a_i = (a_{i1}, a_{i2}, \ldots a_{ip}) \tag{4}$$

$$b_j^n = (b_{j1}^n, b_{j2}^n, \ldots b_{jp}^n) \tag{5}$$

are expressed (p is the dimension for each vector), the distance between the vector $a_i$ and the vector $b_j^n$ is defined as follows:

$$d^n(i, j) = \sum_{u=1}^{p} |a_{iu} - b_{ju}^n| \qquad (6)$$

w(k) is a weighting coefficient to be variously considered, but is decided to solve the formula (3) by the dynamic programming method.

The formula (3) means that by making the correspondence between the feature vector $a_i$ (i=1, 2 ... I) of pattern T and the feature vector $b_j^n$ (j=1, 2 ... 1) of pattern $R^n$ to be optimum, thereby a minimum value relative to the correspondence of the weighted average of the distance between the vectors being corresponded to each other is obtained, and the minimum value is represented as the distance between the pattern T and the pattern $R^n$.

FIG. 1 is a lattice graph to illustrate the above matter, in which the axis of abscissa represents the coordinates corresponding to the respective vectors in the series of feature vectors of the input pattern T and the axis of ordinate represents coordinates corresponding to the respective vectors of the series of feature vectors of the reference pattern $R^n$. The correspondence of the vectors can be shown by the lattice point on the graph. Numeral 1 designates a line connected the lattice points in a manner of time series. Hereinafter, the line is called a "path" to provide the correspondence of the feature vectors of pattern T and pattern $R^n$.

When the distance between the patterns is defined as foregoing, it is problematical how to solve the formula (3). Referring to FIG. 1, it is the problem how to find an optimum path giving the minimum value of the weighted average, which is solved of course theoretically by computing all the paths from the lattice point (1, 1) to that (I, $J^n$), but such massive computation is required therefor as to be not realizable. Such method, however, is similar to the shortest path problem in the dynamic programming method so as to be expected to effectively solve the problem by applying said method, which is called the DP matching.

From the theory of dynamic programming it is necessary for applying that the principle of optimality holds. That is, referring to FIG. 1, assuming that the optimum path 1 from the lattice point (1,1) to that (i, $J^n$) is found, the optimum path from the point (1,1) to that (i, J) with respect to an optional point (i, J) is identical with a path from the point (1,1) to that (i, J) on the path 1. If this can be said, the optimum path from the lattice point (1, 1) to that $P_0$ is obtained in a manner that the point possible to be taken one before the point $P_0$ is represented by $P_1$ ... $P_u$ the respective optimum path from (1,1) to $P_1$ ... $P_u$, and the sum of weight of the distance between the vectors along the optimum path (hereinafter, the sum of weight of the distance between the vectors along a path from a certain point to a certain point is referred to as "the cumulative distance", a path to give a minimum value thereof is referred to as "the optimum path", and the cumulative distance therealong is referred to as "the minimum cumulative distance") is obtained, the minimum cumulative distance corresponding to $p_u$ is represented by $G_u$, and the weighting coefficient along the path from $p_u$ to $p_0$ is represented by $w_{u0}$, the minimum cumulative distance $G_0$ to $p_0$ is obtained in the following formula:

$$G_0 = \min_{u=1\sim u} [G_u + w_{u0} \cdot d^n(p_0)] \qquad (7)$$

In other words, in order to obtain $G_0$, there is no need to compute the cumulative distance along the path regarding all round paths from (1,1) to $p_0$, but each already computed cumulative distance from (1,1) to $P_1$ .. . $P_u$ is usable and subsequently $G_0$ is obtained. Accordingly, stepwise such computation from (1,1) to (I, $J^n$) results in D (T, $R^n$). Also, apparently, all the minimum cumulative distances having been calculated are not required to be stored, but the distance to be next.

The next problem is whether the formula (3) satisfies the principle of optimality. If not satisfied, what is required for the condition to satisfy it. In conclusion, the above formula generally does not satisfy it. Next, the reason for the above and a condition to allow the principle of optimality to hold will be obtained.

In the aforesaid example, assuming that the point $p_u$ is selected as the point before $p_0$ when the sum of weighting coefficient along the optimum path $L_u$ from (1, 1) to $p_u$ is represented by $w_u$, minimum cumulative distance by $G_u$, the sum of weighting coefficient along other optional paths $L_u'$ from (1, 1) to $p_u$ by $w_u'$ and the cumulative distance by $G_u'$, apparently from the assumption, $$G_u/W_u < G_u'/W_u' \qquad (8)$$

is expressed. In this case, in order that the principle of optimality holds, when the formula (8) holds, the following inequality should hold:

$$\frac{G_u + W_{u0} \cdot d^n(p_0)}{W_u + W_{u0}} < \frac{G_u' + W_{u0} \cdot d^n(p_0)}{W_u' + W_{u0}} \qquad (9)$$

where $W_{u0}$ is the weighting coefficient along the path from $p_u$ to $p_0$. However, it is clarified by actually putting numerals into the above that it generally does not hold. The inequality (9) holds only when $W_u = W_u'$, which means that in order that the formula (3) is solved by the dynamic programming, it is necessary that the sum of weighting coefficient along the optimum path connecting two points is constant regardless of the paths in the corresponding lattice graph.

In a case that the pattern matching is actually solved by the dynamic programming method, various restraining conditions, other than the above-mentioned conditions, are usually set in the selective path or a range thereof from the property of the speech signal. FIG. 2a shows a restraining condition for the path selection as one example for the restraining conditions, which means that paths to the point (i, j) should inevitably adopt a path 2 from the point (i-2, j-1) through (i-1, j), a path 3 coming from the point (i-1, j-1), or a path 4 from the point (i-1, j-2) through (i, j-1). At this time, a maximum inclination of the selective path is 2 and a minimum is ½. Assuming that the initial ends and the last ends of input pattern and reference pattern are allowed to inevitably correspond to each other, as shown in FIG. 1, the path from the point (1 1) to that (I, $J^n$) is limited in a hatched portion. The reason for the restriction is to avoid too extreme correspondence to occur, according to the fact that the time axis, even though it expands and contracts when the length of the input pattern is changed at every speech, must not do so extremely with respect to the same word.

Letters a to e in FIG. 2a show the weighting coefficient when the respective paths are selected, which weighting coefficient may optionally be decided only when the principle of optimality is satisfied, but is usually decided as follows:

(A) Symmetric Type

The sum of weighting coefficients along the path connecting two points on the lattice graph is made equal to an adding value of an increment of i coordinate and that of j coordinate between the two points. Hence, the sum of weighting coefficients at an optional path from the point (1, 1) to that (I, $J^n$) becomes $I+J^n$ or $I+J^n-1$(=constant) depending upon 2 or 1 of the initial value of weighting coefficient at the point (1, 1).

Asymmetric Type (1) the sum of weighting coefficients along the path connecting two points on the lattice graph is equalized to an increment of i coordinate between the two points. Hence, the sum of weighting coefficients on an optional path from the point (1, 1) to that (I, $J^n$) becomes I(=constant), which is hereinafter referred to as the asymmetric type (1).

(2) The sum of weighting coefficients along the path connecting two points on the lattice graph is equalized to an increment of j coordinate between the two points. Accordingly, the sum of weighting coefficients on an optional path from the point (1, 1) to that (I, $J^n$) becomes $J^n$(=constant), which is hereinafter referred to as the asymmetric type (2).

Accordingly, in FIG. 2a, when in the symmetric type, a=c=e=2 and b=d=1 are obtained, when in the asymmetric type (1), a=b=c=e=1 and d=0, and when in the asymmetric type (2), a=c=d=e=1 and b=0. Alternatively, for the asymmetric type (1), a=b=c=1 and d=e=0.5 may be used, and for that (2), a=b=0.5 and c=d=e=1 way be used, which are rather often used. The actual recurrence formula corresponding to the formula (7) to find the optimum path under the restraining condition for the path in FIG. 2a is as follows:

$$G^n(i,j) = \min \begin{bmatrix} G^n(i-2, j-1) + a*d^n(i-1,j) + b*d^n(i,j) \\ G^n(i-1, j-1) + c*d^n(i,j) \\ G^n(i-1, j-2) + e*d^n(i,j-1) + d*d^n(i,j) \end{bmatrix} \quad (10)$$

Initial condition: $G^n(1, 1) = 2*d^n(1, 1)$ (or $d^n(1, 1)$) where $G^n(i, j)$ is the minimum cumulative distance between the points (1, 1) and (i, j) at the lattice graph.

Therefore, a distance, corresponding to the formula (3), between the input pattern T and the reference pattern $R^n$ is given in the following equation:

$$D(T, R^n) = \frac{G^n(I, J^n)}{\text{sum of weighting coefficient}}$$

The sum of weighting coefficient is $I+J^n$ or $I+J^n-1$ for the symmetric type, 1 for the asymmetric type (1), and $J^n$ for the asymmetric type (2) and their values are constant regardless of the paths when n is constant.

As a result, when n for the minimum $D(T, R^n)$ is represented by $\hat{n}$, in other words, when given in $$\hat{n} = \underset{n}{\operatorname{argmin}}[D(T, R^n)]$$

$\hat{n}$ becomes the recognition result. In the above, the reason for dividing the minimum cumulative distance $G^n(I,J^n)$ by the sum of weighting coefficient is considered to normalize the sum of weighting coefficient along the matching path because it is generally different in every word.

For the asymmetric type (1), especially since the sum of weighting coefficient, that is, the normalization coefficient, is equal to the number I of feature vectors of the input pattern and constant in spite of the kind of reference standard pattern $R^n$ (not depending on $J^n$), when only relative comparison regarding $D(T,R^n)$ is carried out on n, $D(T,R^n) = G^n(I,J^n)$ is usable.

Other various restraining conditions for the path are considered. Other examples are shown in FIGS. 2b through 2j, in which paths connectable with the lattice point (i,j) are shown. Various modifications other than this are considered. The sum of weighting coefficient along these paths, as above-mentioned, when in the symmetric type, need only be equal to the added value of increment of i coordinate and that of j coordinate when in the asymmetric type (1), to an increment of i coordinate and when in the asymmetric type (2), to an increment of j coordinate, respectively. FIGS. 2e and 2i mean that the paths shown by the broken lines are not adopted, so that when this restraining condition is used, the path is such that the same value of i or j continues over three points cannot be adopted.

Next, explanation will be given of a recognition method when an input is pronounced in a series of several words. As same as the isolated word pronunciation, when the input pattern is represented by $$T = a_1 a_2 \ldots a_i \ldots a_I$$

and when the reference pattern for the nth word by $$R = b_1^n b_2^n \ldots b_j^n \ldots b_{J^n}^n$$

then the method is a problem to find a series of words q(1), q(2), ..., q(x) with the minimum distance between the combination R and the vector series of input pattern T, where the combination R of reference pattern corresponding to a number of X words series is represented by $$R = R^{q(1)} R^{q(2)} \ldots R^{q(X)} = b_1^{q(1)} b_2^{q(1)} \ldots b_{J^{q(1)}}^{q(1)} \\ b_1^{q(2)} b_2^{q(2)} \ldots b_{J^{q(2)}}^{q(2)} \ldots b_1^{q(X)} b_2^{q(X)} \ldots \\ b_{J^{q(X)}}^{q(X)}$$

In the above computation, when various combination patterns of word reference pattern are considered directly to the reference pattern and the computation is intended to be solved by the DP matching as same as the isolated pronunciation word recognition, for example, when the words are stored as the reference pattern, in order to recognize speech of three words continuously pronounced, it must match the reference patterns of $10^3 = 1000$ kinds and three times the length thereof (the number of feature vectors). Thus, when the number N or the combination number of the word reference pattern increases, the calculation amount soon becomes prohibitive.

In order to apply the DP matching to the continuous word recognition, various algorithm including the aforesaid two level DP has been developed. Next, the fundamental solution therefor will be described.

Now, assuming that the ith vector at the input pattern is the last vector of a certain word hereinafter, the word is referred to as the rearmost word name at the input frame i, where the frame means an analysis section of speech signal corresponding to the individual feature vector when the speech signal is converted into the series of feature vectors, and is converted into one feature vector every frame). If, in a condition of m<i, the minimum cumulative distance between the local pattern T(l,m) of the input pattern and the combination pattern of word reference pattern coupled to approach it in the smallest distance in the sense of the DP matching is represented by D(m) and the minimum cumulative distance between the local pattern T(m+1: i) of the input pattern and the nth word reference pattern $R^n$ is represented by $D^n$(m+1:i), if the following formula (11) holds, the dynamic programming method also is applicable to combination of word reference patterns, thereby enabling a large computation amount to be reduced.

$$D(i) = \min_{n,m}[D(m) + D^n(m + 1: i)] \ m < i \quad (11)$$

This equation (11) means that the minimum cumulative distance D(i) between the local pattern T(1,i) of the input pattern and the combination pattern of word reference patterns coupled in the smallest distance in the sense of the DP matching is obtained by minimizing as to m and n the sum of the minimum cumulative distance D(m) between the local pattern T(l,m) of the input pattern and the combination pattern of word reference pattern coupled in the smallest distance in the sense of the DP matching, and the minimum cumulative distance $D^n$(m+1: i) between the local pattern T(m+1, i) of the input pattern and the nth word reference pattern $R^n$. Accordingly if it can be said, by sequentially computing the recurrence formula as to i=1 to I, the combination of the optimum reference pattern with respect to the input pattern T and the minimum cumulative distance D(T,R)=D(1) corresponding thereto are obtained.

Next, the condition that the equation (11) holds will be obtained.

As same as described in the isolated word recognition, in the lattice graph in which the axis of ordinate represents combination of word reference pattern resulting in the D(m) and the axis of abscissa represents the input pattern, when the sum of weighting coefficients along the optimum path with respect to the local pattern T(l,m) of input pattern is represented by W, in the lattice graph representing combination of other desired word reference patterns on the axis of ordinate and the input pattern on the axis of abscissa, when the sum of weighting coefficient along a desired path with respect to T(l,m) is represented by W' and the minimum cumulative distance is represented by D'(m), and in the lattice graph representing the nth word reference pattern $R^n$ on the axis of ordinate and the partial pattern T(m+1: i) of input pattern on the axis of abscissa, when the sum of weighting coefficient along the optimum path with respect to the local pattern T(m+1, i) of input pattern is represented by w, from the principle of optimality, if (m)/W < D'(m)/W' the inequality:

$$\frac{D(m) + D^n(m + 1)}{W + w} < \frac{D'(m) + D^n(m + 1)}{W' + w}$$

should hold. Therefore, W=W' should hold as same as the aforesaid isolated pronounciation word recognition. In other words, whatever the reference pattern may be, the sum of weighting coefficient along the desired path with respect to T(l,m) at the lattice graph must be unchanged. In order to satisfy it, the weighting coefficient along the path is apparently decided enough to be equalized to the number of frames of input pattern, thereby enabling adoption of the asymmetric type (1). FIG. 3 shows some examples thereof, in which numeral values on the path are weighting coefficients when the path is selected. In this case, the symmetric type and asymmetric type (2) are not applicable unless the specified condition is added.

Next, the two level DP as the conventional example to solve the equation (11) will be described. At first, the terms and references are defined.

D(i): the terminal cumulative distance a minimum cumulative distance between the partial pattern T(l,i) and the combination pattern of the word reference pattern coupled in the smallest distance therefrom in the sense of the DP matching.

$D^n$(s:t): local cumulative distance the cumulative distance between the local pattern T(s,t) of input pattern and the nth word reference pattern $R^n$.

N(i): the rearmost word name the rearmost word name in the word row for giving above D(i).

B(i): back pointer The second terminal frame number from the rearmost end of word row for giving the D(i).

N: recognition word number

I: frame number of input pattern (the number of feature vectors)

$J^n$: frame number of reference pattern $R^n$ (the number of feature vectors)

The steps of processing are as follows:
(A1) Initial value setting D(0)=0, B(0)=0
(A2) The steps (A3) to (A6) are executed as to i=1 to I.
(A3) The steps (A4) to (A5) are executed as to n=1 to N.
(A4) Regarding m=i−$J^n$−r−1 through i−$J^n$+r−1 (r: the number previously moderately decided to specify a matching range), DP matching of T(m,i) with $R^n$ is executed to obtain a local cumulative distance $D^n$(m:i) between T(m,i) and $R^n$.

(A5) To obtain $D^n(i) = \min_m[D(m) + D^n(m + 1:i)]$.

When m to satisfy this equation is represented by m̂, $B^n$(i)=m̂.

(A6) To obtain $D(i) = \min_m [D^n(i)]$.

When n to satisfy this formula is represented by n, $B(i)=B^{\hat{n}}(i)$, $N(i)=\hat{n}$.

(A7) Put i=I.

(A8) n=N(i).

(A9) When B(i)=0 the process finishes, and when $B(i) \neq 0$, i=B(i) and the process returns to (A8).

The step (A4) carries out the DP matching of T(m,i) and $R^n$ with respect to m in the appointed range by use of the same method as isolated word recognition, when the weighting coefficient must adopt the asymmetric type (1) for the aforesaid reason. r is to define a width of a matching window so that path to be adopted is defined in the hatched portion in FIG. 4 so as to avoid unreasonable correspondence.

A concrete example of the step (A4) is shown below.

FIG. 5 shows the constraint on the path. In FIGS. 2 and 3, the so-called "forward" path is described for the convenience of explanation, but in a case of actually using the two level DP, the backward path is often used for the reason that less memory is sufficient and the real-time processing is possible. Numerals shown on the path are the weighting coefficients. The recurrence formula corresponding to this case is as follows: In this case, however, $G^n(i', j)$ is a minimum cumulative distance from the lattice point $(I, J^n)$ to that $(i', j)$.

$$G^n(i',j) = \min \begin{bmatrix} G^n(i'+1, j+2) + 0.5*d^n(i',j+1) + 0.5*d^n(i',j) \\ G^n(i'+1, j+1) + d^n(i',j) \\ G^n(i'+2, j+1) + d^n(i'+1,j) + d^n(i',j) \end{bmatrix} \quad (12)$$

$$i - J^n + j - r \leq i' \leq i - J^n + j + r \quad (13)$$

initial value: $G^n(i, J^n) = d^n(i, J^n)$ \quad (14)

$$D^n(m:i) = G^n(m,i) \quad i - J^n + 1 - r \leq m \leq i - J^n + 1 + r \quad (15)$$

The above recurrence formula is calculated as follows:

(B1) To calculate (B2) at every j from $j=J^n$ to j=1.

(B2) To calculate the recurrence formula (12) at every i' from $i'=i-J^n+j-r$ to $i'=i-J^n+j+r$.

(B3) To replace $D^n(m:i)=G^n(m,1)$ from $m=i-J^n+1-r$ to $m=i-J^n+1+r$.

Thus, the local cumulative distance $D^n(m:i)$ between the local pattern T(m,i) of input pattern and the reference pattern $R^n$ is obtained at once as to each of the initial end candidate frames $m=i-J^n+1-r$ to $i-J^n+1+r$.

The step (A5) obtains the terminal cumulative distance when the rearmost word name is represented by n, in other words, the minimum cumulative distance $D^n(i)$ between the local pattern T(l,i) of input pattern and the combination pattern of word reference pattern coupled in the smallest distance in the sense of the DP matching when the rearmost word name is represented by n and the back pointer (the last frame number of a word one before the word n) $B^n(i)$. At this step, the last cumulative distance at the ith frame, when each of word numbers n=1 to N is made to be the rearmost word name, is obtained.

In the step (A6), n to give a minimum value of the last cumulative distance regarding the rearmost word name n and the back pointer thereof are obtained and stored in the memory places N(i) and B(i).

The steps (A7) to (A9) make an operation called back track, in which N(i) and B(i) at each frame obtained by executing the steps (A3) to (A6) regarding i=1 to I output the result of recognizing the input words in the reverse order to the input. In other words, the result of recognition of the last word of the speech introduced by N(I) is obtained, the last frame of the second word from the last is obtained by B(I), the rearmost word name having B(I) as the last frame is obtained by N(B(I)) as the second word from the last, the last frame of the third word from the last is obtained by B(B(I)), and the rearmost word name having B(B(I)) as the last frame is obtained by N(B(B(I))) as the third word from the last, such operation is executed until B(i)=0 is obtained. FIG. 6 is a flow chart showing the above.

The aforesaid examples have no information regarding the word number or the order of development with respect to the input word and anyway find the reference pattern row best matching with the input pattern. In a case that the number of input words is previously known or the syntax rule regarding the input word is decided, this information is used to enable the accuracy for recognition to be increased.

When the number of input words is known, the recurrence formula (11) is changed as follows:

$$D_x(i) = \min_{m,n} [D_{x-1}(m) + D^n(m:i)] \quad m < i \quad (16)$$

where $D_x(i)$ is the minimum cumulative distance between the local pattern T(l,i) of input pattern and the combination pattern of word reference pattern coupled to approach in the shortest distance in the sense of DP matching and under the limitation that the number of words to be coupled is x. The minimum cumulative distance will be hereinafter referred to as the terminal cumulative distance. Hence, in this case, the processing step is changed as follows:

(C1) Initial value setting $D_x(0)=0$, $B_x(0)=0$ for x to $1 \sim X$ $D_0(i)=\infty$, $B_0(i)=\infty$ for i=1 to I (C2) To execute (C3) to (C6) regarding i=1 to I.

(C3) To execute (C4) to (C5) regarding n=1 to N.

(C4) Regarding $m=i-J^n-r-1$ to $i-J^n+r-1$ (r: numeral previously properly decided to define the matching range), T(m,i) and $R^n$ are subjected to DP matching to thereby obtain a local cumulative distance $D^n(m:i)$ between both.

(C5) Regarding x=1−X.

$$D_x^n(i) = \min_m [D_{x-1}(m) + D(m+1:i)] \text{ is obtained.}$$

when m to satisfy this equation is represented by $\hat{m}$, $B_x^n(i)=\hat{m}$.

(C6) Regarding x=1 to X, $$D_x(i) = \min_n [D^n(i)] \text{ is obtained}$$

when n to satisfy this formula is represented by n, $B_x(i) = B_x^{\hat{n}}(i)$, and $N_x(i) = \hat{n}$.

(C7) Put i=I, x=X.
(C8) n=$N_x(i)$.
(C9) When $B_x(i)=0$, the process finishes. When $B_x(i)\ne 0$, $i=B_x(i)$ and $x=x-1$ and the process returns to (C8).

$B_x(i)$ is the terminal frame number of the second word from the rearmost one of word row to give the $D_x(i)$, that is, back pointer, and $N_x(i)$ is the rearmost word name of word row to give $D_x(i)$. A difference between the case of the word number known and the case of word number unknown is that at each frame i=1 to I of input pattern, all possibilities for the word number, that is, the terminal cumulative distance, the back pointer and the rearmost word name are obtained at every x=1 to X. Accordingly, the back track is carried out in consideration of the word number x other than the frame i. FIG. 7 is a flow chart of the back track when the word number is known.

Furthermore, explanation will be given on a case where the automaton expression is possible when the syntax rule regarding the input word is decided.

FIG. 8 shows an example for describing the concept of continuous word speech recognition by an automaton control. This example is to read out a numeral of three digits in English, in which marks ⊚ and ⊙ represent the state and ⊙ is the state [to be] able to be the last. For example, when 235 is read in English, it sounds "two hundred and thirty five". Hence, upon pronouncing word "two", the initial state 0 is transferred to the state 1. Upon pronouncing word "hundred", the state 1 is transferred to the state 2. Upon pronouncing word "and", the state 2 is transferred to the state 3. Upon pronouncing word "thirty", the state 3 is transferred to the state 4. Upon pronouncing word "five", the state 4 is transferred to the state 5 and the process is finished. In another example, for number 63, when the word "sixty" is pronounced, the initial state 0 is transferred to the state 4 and when word "three" is pronounced, the state 4 is transferred to the state 5 and the process is finished. In this case, the input word thus is introduced only by the order and combination defined in the drawing. Thus, under the previous knowledge the recognition is carried out.

In a case of the continuous word speech recognition by automaton control, the recurrence formula (11) is changed as follows:

$$D_q(i) = \min_{m,p}[D_p(m) + D^n(m:i)] \quad m < i \quad (17)$$

where p and q represent the states, p representing the state one before q to be transferable thereto. $D_q(i)$ is the minimum cumulative distance between the local pattern T(l,i) of input pattern and the combination pattern of word reference pattern coupled to approach at the smallest distance in the sense of the DP matching under the limitation that the last state of the state row which corresponds to the word to be combined in q. The minimum cumulative distance will hereinafter be referred to as the terminal cumulative distance. Accordingly, the processing step in this case is changed as follows:

(D1) Initial value setting $D_q(0)=0, B_q(0)=0$ for q=1 to Q $D_0(i)=\infty, B_0(i)=\infty$ for i=1 to I (D2) As to i=1 to I, the steps (D3) to (D6) are executed.

(D3) As to n=1 to N, the steps (D4) to (D5) are executed.

(D4) DP matching of T(m,i) with $R^n$ is carried out regarding $m=i-J^n-r-1$ to $i-J^n+r-1$ (r: a predetermined proper value to define the matching range) and the local cumulative distance $D^n(m:i)$ between both of them is obtained.

(D5) Regarding q=1 to Q, $$D_q^n(i) = \min_{m,p}[D_p(m) + D_n(m+1:i)]$$

when m and p to satisfy this equation are represented by $\hat{m}$ and $\hat{p}$, $B_q^n(i)=\hat{m}, S_q^n(i)=\hat{p}$ where the state p is adoptable as the state one before q.

(D6) Regarding q=1 to Q, $$D_q(i) = \min_n [D_q^n(i)]$$

when n to satisfy this formula is represented by n, $B_q(i)=B_q^{\hat{n}}(i), N_q(i)=\hat{n}$ (D7) i=I, $$q = \operatorname*{argmin}_{q\ F}[D_q(i)]$$

(F: a set of the last state)

(D8) n=$N_q(i)$ (D9) When $B_q(i)=0$, the process finishes. When $B_q(i) \ne 0$, $i=B_q(i)$ and $q=S_q(i)$ and the process returns to (D8).

where $B_q(i)$ is the terminal frame number of the second word from the rearmost one at the word row for giving $D_q(i)$, that is back pointer, $N_q(i)$ is the rearmost word name at the word row for giving $D_q(i)$, and $S_q(i)$ is the second state from the last state at the state row for giving $D_q(i)$. A difference between the case of automaton control and that of unknown word number is that the terminal cumulative distance, back pointer, the rearmost word name and the state before the last state are obtained at every enable state q=1 to Q at each frame i=1 to I of input pattern. Hence, the back track is also carried out in consideration of the state q other than the frame i. FIG. 9 is a flow chart showing the back track in automaton control.

The case of unknown word number and that of already known word number are considered as a special case of automaton control. FIG. 10A shows automaton expression for the case of unknown word number and FIG. 10B shows the automaton expression for the case of already known word number of three-digit integer, in which reference w is an arbitrary word included as the recognition vocabulary.

As seen from the above examples, when using of two level DP, the local cumulative distance at each case in the steps (A4) (B4) (C4) (D4) is all similarly computed so that at any case a calculation amount of the distance between the vectors and that of the recurrence formula (12) are the same.

In the aforesaid processing, calculation of the distance $d^n(i,j)$ between the vectors in the steps (A4) (B4) (C4) (D4) requires the largest amount of calculation. For example, when the dimension number of feature vectors assumed 15 dimensions and the distance between the vectors is defined by the formula (6), calculation of a distance between two feature vectors requires 15 times subtractions and 14 times additions, which calculation is necessary for every one lattice point at the lattice graph. Therefore, the comparison evaluation of calculation amount in the various systems depends on the number of lattice points to be calculated.

The number of calculation times for the distance between the vectors at two level DP amounts to about $(2*r+1) *N*I*J$, because when the mean number of frames of reference pattern is represented by J, it is required to make calculation for the number of lattice points within the hatched parallelogram shown in FIG. 4 in regard to word $n=1$ to N and input pattern frame $i=1$ to I. The calculation of minimum cumulative distance by the recurrence formula (12) is quite similar to the above.

SUMMARY OF THE INVENTION

An object of the present invention is to provide a method and an apparatus applicable to any case and largely reducing the calculation amount of local cumulative distance requiring the largest amount.

The present invention is applicable to continuous word speech recognition or the like, which compares to collate by DP matching input patterns with combination patterns of a reference pattern registered as [an] individual discrete patterns to thereby find the combination of the reference patterns best matching with the input pattern and which can largely reduce the amount of calculation in comparison with the conventional apparatus and is applicable to any case of unknown word number, already known word number and automaton control.

The present invention comprises the steps of:

converting input signals to a feature vector series $T=a_1 a_2 \ldots a_i \ldots a_I$;

calculating vector-to-vector distance $d^n(i,j)$ between the ith feature vector $a_i$ of the input pattern and the jth feature vector $b_j{}^n(n=1, 2 \ldots, N; j=1, 2 \ldots, J)$ of the reference pattern $R^n$;

calculating a local cumulative distance by obtaining the distance $D^n(m+1:i)$ between the local pattern $a_{m+1} a_{m+2} \ldots a_i$ of the imput pattern and the reference pattern $R^n$ with respect to various m in a predetermined range, and including the steps of:

(S1) carrying out weighting corresponding to the aforesaid asymmetric type (2) on an i-j plane representing the input pattern $T=a_1 a_2 \ldots a_i \ldots a_I$ as the axis of abscissa and the reference pattern $R^n = b_1{}^n b_2{}^n \ldots b_j{}^n \ldots b_j{}^n$ as the axis of ordinate, relating the sum of load coefficient (normalization coefficient) along the matching path always only to a length of the reference pattern regardless of the manner of the selection thereof, thereby finding by the dynamic programming the path whose sum of weight of the vector-to-vector distance along the path is minimum, (S2) converting the pattern-to-pattern distance, when each of several frames before and after the starting end point on the i-axis of the path giving the minimum load sum is selected as the starting end point to the reference pattern $R^n$ of local pattern of the input pattern, to be equivalent to that of the case in which the weighting of the normalization coefficient is made corresponding to the asymmetric type (1), thereby using the distance as the local cumulative distance $D^n(m+1;i)$;

calculating a terminal cumulative distance, by minimizing the sum of terminal cumulative distance for the mth frame of the input pattern and the local cumulative distance $D^n(m+1:i)$ with respect to $n(n=1, 2 \ldots, N)$ and m in the aforesaid range, and by taking the sum as the terminal cumulative distance of the ith frame of the input pattern, wherein n in the above situation is represented by $\hat{n}$ and $\underline{m}$ by $\hat{m}$, thereby memorizing n as the rearmost word name and $\hat{m}$ as a back pointer regarding each $i(i=1, 2 \ldots, I)$ of the input frame; and determining the individual pattern introduced, when the input finishes, by determining the patterns in the reverse order to the input order with the initial value $i=I$ from the rearmost word name and back pointer stored as to each i.

The above and further objects and novel features of the invention will more fully appear from the following detailed description when the same is read in connection with the accompanying drawings.

BRIEF DESCRIPTION OF THE DRAWINGS

FIG. 1 is a lattice graph explanatory of DP matching,

FIGS. 2a through 2j are views exemplary of the limit condition for selecting a path, FIGS. 10A and 10B are views respectively exemplary of automaton expression with respect to the case of unknown number of words and the case of the known number of the same, FIGS. 11a through 11e, 12, 13a and 13b are views explanatory of the principle of the present invention, FIGS. 23 through 27 are flow charts explanatory in detail of the processing in each part of a second embodiment which contains a further developed apparatus of that of the first embodiment.

DESCRIPTION OF THE PREFERRED EMBODIMENTS

Figure 3A:
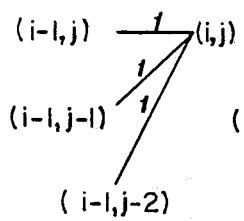
FIGS. 3a through 3e are views exemplary of the selection condition of the path and the weighting coefficient.
Figure 3B:
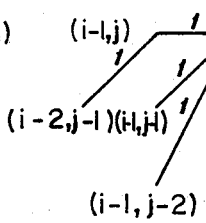
Figure 3C:
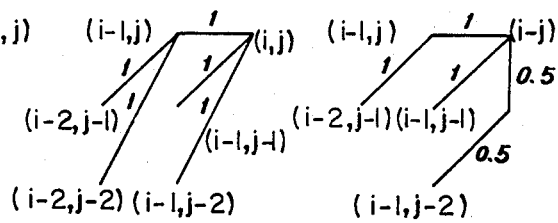
Figure 3D:
Figure 3E:
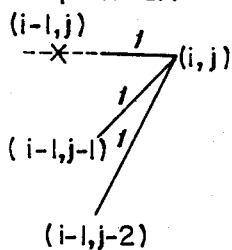

The recurrence formula (11) for solution for continuous word speech recognition of the unknown number of input words, the recurrence formula (16) for solution for continuous word speech recognition of the previously known number of the input words and the recurrence formula (17) for solution for continuous word speech recognition of automaton control, all require calculation of local cumulative distance $D^n(m+1:i)$.

The present invention provides a pattern comparison apparatus characterized in the method of calculating the local cumulative distance $D^n(m+1:i)$, by which the calculation amount therefor can be largely reduced. The essential points for the processing step are as follows:

(E1) The minimum value with respect to the minimum cumulative distance m between the local pattern $T(m+1,i) = a_{m+1} \ldots a_i$ of the input pattern and the reference pattern $R^n = b_1{}^n b_2{}^n \ldots b_j{}^n \ldots b_{jn}$ is obtained under the path condition setting the local coefficient by a method corresponding to the asymmetric type (2), which is put as $D^n(i,J^n)$. At this time, the sum of weighting coefficient along the matching path for both patterns is $J^n$.

(E2) $D^n(i,J^n)$ is so converted that the sum of weighting coefficient along the path is equivalent to that obtained under the path condition set by the method corresponding to the asymmetric type (1), which is represented by $D^n(m+1,i)$. At this time, the sum of weighting coefficient along the matching path for both the patterns is $i-m$.

The step (E1) is the technique known as the conventional word spotting, which is used for finding the local section of the input pattern best matching with the reference pattern $R^n$ (at the smallest distance in the sense of DP matching) with respect to the continuously pronounced word speech input pattern. Of course, when the matching of local pattern $T(m+1, i)$ of input pattern with the reference pattern $R^n$ is carried out with respect to all combinations of m and i in $m<i$ so that m and i for the minimum value of the normalized minimum cumulative distance are represented by $m_0$ and $i_0$, the local section of the input pattern to be found is obtained as $m_0$ to $i_0$, which requires huge calculation. However, the weighting coefficient is obtained under the path condition set by the method corresponding to the asymmetric type (2), thereby enabling the calculation amount to be largely reduced. The present invention applies this principle and aims at large reduction of the calculation amount at the continuous word speech recognition. At first, the principle will be described.

The principle of optimality described by use of the inequalities (8) and (9) is applied to the fixed matching initial end point and terminal point. However, in order to maintain the optimality principle even in a case of not fixing the initial end point, it is examined what condition is to be satisfied. When the initial end point of local pattern of the input pattern to be matched is represented by m, in order that the formula (9) holds under the condition of the formula (8) with respect to a desired value of m in $1<m<I$, apparently, the sum of weighting coefficient along the matching path from the point (m,l) to that $p_u$ need only be constant regardless of the value of m and the path. For this purpose, the weighting coefficient need only be provided in a manner that the sum of weighting coefficient along the path connecting two points on the lattice graph is equal to an increment in the j coordinate (the axis corresponding to the reference pattern at the lattice graph) between the two points as the asymmetric type (2).

FIG. 11 shows some examples of the restraining condition for the path, in which numerals attached to each path are the weighting coefficients when the path is selected.

FIG. 12 is a lattice graph further intuitively explaining the above, in which the axis of abscissa represents the input pattern and the axis of ordinate the reference pattern to be matched. In this example, the limit condition of the path in FIG. 11a is used. In the same drawing, when reference numerals 11 through 15 are assumed the initiative end candidate of the local section of the input pattern, the optimum path to the lattice point 7 is obtained as follows:

(F1) Initialization: The minimum cumulative distance at the lattice points 11 through 15 is put as a distance between the feature vectors of the input pattern and the reference pattern.

(F2) Processing at the lattice point 8: It is calculated which path from the lattice points 11 to 13 is optimum, and the minimum cumulative distance and the i coordinate (the frame number of the input pattern, which is called the initial end pointer at the lattice point 8) of the lattice point for giving the distance among the lattice points 11 through 13 are stored.

(F3) Processing at the lattice point 9: It is calculated which path is optimum from the lattice point 12 through 14, and the minimum cumulative distance thereof and the i coordinate (the initial end pointer at the lattice point 9) of the lattice point to give the distance among the lattice points 12 through 14 are stored.

(F4) Processing at the lattice point 10: It is calculated which path is optimum from the lattice points 13 through 15 and the minimum cumulative distance and the i coordinate (the initial end pointer at the lattice point 10) of the lattice point to give the distance among the lattice points 13 through 15 are stored.

(F5) Processing at the lattice point 7: It is calculated which path is optimum from the lattice points 8 through 10 and the minimum cumulative distance, and the initial end pointer of the lattice point to give the distance among the lattice points 8 through 10 are stored.

As a result of the above processings, when the feature vector of the reference pattern corresponding to the lattice point 7 is represented by $b_j{}^n$ and the feature vector of the input pattern is represented by $a_i$, the local pattern of input pattern in the smallest distance in the sense of DP matching to the local pattern $b_1{}^n b_2{}^n \ldots b_j{}^n$ of the reference pattern, that is, the initial end frame of local pattern of the rearmost feature vector of $a_i$ is given by the initial end pointer at the lattice point 7 so that the minimum cumulative distance at the lattice point 7 is the minimum cumulative distance between the local pattern of input pattern and the local pattern of the reference pattern.

If the weighting coefficient, as the symmetric type or the asymmetric type (1), is given as the amount that the sum of weighting coefficient along the path connecting between the two points on the lattice graph relates to an increment of the i coordinate (the axis corresponding to the input pattern at the lattice graph) between the two points, it is necessary that respective minimum cumulative distances are obtained as to a case that the lattice point 11 is the initial end point and the lattice point 7 is the terminal point, the lattice point 12 is the initial end point and the lattice point 7 is the terminal point, the lattice point 13 is the initial end point and that 7 is the terminal point, the lattice point 14 is the initial end point and the lattice point 7 is the terminal point, and the lattice point 15 is the initial end point and the lattice point 7 is the terminal point, and that the most suitable distance must be selected wherein each cumulative distance being normalized by the sum of weighting coefficient, in which the calculating amount fairly increases in comparison with the above method.

The word spotting is actually carried out with respect to the reference pattern $R^n$ as follows: Here, the limit condition of the matching path and the additional condition of load coefficient are as shown in FIG. 11a.

(G1) As to i=1 to I, (G2) through (G3) are executed.
(G2) Initialization: $\overline{D}^n(i,1) = d^n(i,1)$, $\overline{B}^n(i,1) = i$
(G3) As to j=2 to J, the following recurrence is executed:

$$D^{-n}(i,j) = d^n(i,j) + \min \begin{bmatrix} D^{-n}(i-2, j-1) \\ D^{-n}(i-1, j-1) \\ D^{-n}(i, j-1) \end{bmatrix} \quad (18\text{-}1)$$

$$B^{-n}(i,j) = \begin{bmatrix} B^{-n}(i-2, j-1) \ldots \text{when } D^{-n}(i,j) = D^{-n}(i-2, j-1) \\ B^{-n}(i-1, j-1) \ldots \text{when } D^{-n}(i,j) = D^{-n}(i-1, j-1) \\ B^{-n}(i, j-1) \ldots \text{when } D^{-n}(i,j) = D^{-n}(i, j-1) \end{bmatrix} \quad (18\text{-}2)$$

(G4) When $\hat{i} = \text{argmin} [\overline{D}^n(i, J^n)]$, each local section of the i=1 to I input pattern from the $\overline{B}^n(\hat{i}, J^n)$th frame to the ith frame is a section to be obtained.

$d^n(i,j)$ is the distance between feature vector of the jth frame at the reference pattern now in attention and the feature vector of the ith frame at the input pattern, $\overline{D}^n(i,j)$ is a minimum cumulative distance between the local pattern of the input pattern whose ith frame is the rearmost one and the local pattern of the first to jth frames of the reference pattern, and $\overline{B}^n(i,j)$ is an initial end pointer (the optimum selected initial end frame in the sense of minimizing the minimum cumulative distance of the local pattern at the input pattern) corresponding thereto.

Figure 13A:
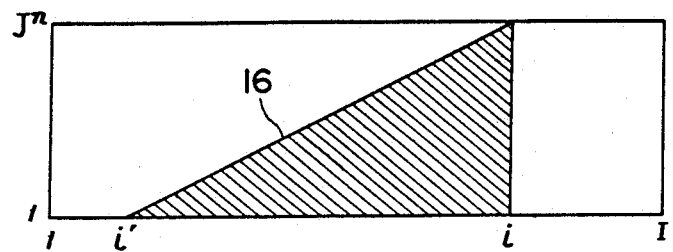
Figure 13B:
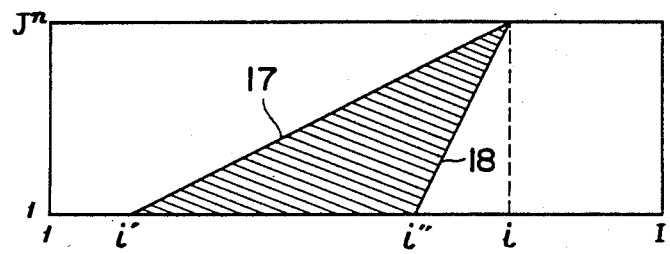

When the restraining condition for the matching path in FIG. 11a is used, the path to the lattice point $(i, j^n)$ is limited in the hatched portion in FIG. 13a, in which reference numeral 16 designates a straight line of inclination of $\frac{1}{2}$ and the axis of abscissa represents the input pattern and the axis of ordinate the reference pattern R. When the intersection of the line 16 and axis i is represented by i', $\overline{B}^n(i, J^n)$ exists between i' and i. Also, when the restraining condition to the matching path in FIG. 11b to 11e is used, the path to the lattice point $(i, J^n)$ is limited in the hatched portion in FIG. 13b, in which reference numeral 17 designates a straight line of inclination of $\frac{1}{2}$ and 18 is that of inclination of 2. When the intersection of the line 17 and axis i is represented by i' and that of the line 18 and axis i by i'', $\overline{B}^n(i, J^n)$ exists between i' and i''.

The present invention, in the two level DP, obtains the local cumulative distance by the above method, thereby aiming at large reduction of calculation amount necessary therefor. However, as mentioned above, in the continuous word speech recognition by the DP matching, in order to satisfy the optimality principle, the load coefficient should be given, as said assymetry (1), in such a manner that the sum of weighting coefficient along the path connecting two points on the lattice graph should depend only on an increment in the coordinate i (the axis corresponding to the input pattern at the lattice graph) between the two points. In the present invention, the local cumulative distance obtained by the asymmetric type (2) is approximately converted to be equal to the minimum cumulative distance obtained by the asymmetric type (1) thereby solving such contradiction.

Even when the minimum cumulative distance between the two points on the lattice graph is obtained by the symmetric, asymmetric (1) or asymmetric (2) type, the weighted average normalized by the sum of load coefficient along the path, that is, the weighted average of distance between the vectors along the path is about equal in any case. Accordingly, when the minimum cumulative distance obtained by the asymmetric type (2) is represented by $D_2$, the sum of load coefficient along the path, that is, the normalization coefficient by $W_2$, the minimum cumulative distance obtained by the asymmetric type (1) by $D_1$, and the sum of load coefficient along the path, that is, the normalization coefficient, by $W_1$, the following formula holds;

$$D_1/W_1 \approx D_2/W_2$$

Hence, the minimum cumulative distance obtained by the asymmetric type (2) can be converted by the following formula into that expected when obtained by the asymmetric type (1):

$$D_1 \approx [D_2/W_2] W_1$$

Hence, taking $$m = \overline{B}^n(i, J^n) - 1$$

the local cumulative distance $D^n(m+1:i)$ between the local pattern of input pattern whose ith frame is the rearmost one and nearest in the sense of DP and the reference pattern Rn, when in consideration of $$D_2 = \overline{D}^n(i, J^n), \quad W_2 = J^n, \quad W_1 = i - m$$

is converted into the following equation:

$$Dn(m+1:i) = D^{-n}(i, J^n) * \frac{i-m}{J^n}$$

In the usual two level DP, the rearmost word name, in which each frame i of input is regarded as the terminal frame, and the initial end frame corresponding thereto are decided as the rearmost word name of combination pattern of the reference pattern, which is most matching with a local pattern T(l,i) of the input pattern, and the initial frame corresponding thereto. According to the method of the present invention, the initial end frame is decided at the step of obtaining the local cumulative distance before the matching is carried out with the entire local pattern T(l,i). In other words, in the conventional two level DP< the rearmost word name and its initial end frame are decided so as to best match with the pattern as a whole, while according to the present method, the initial end frame is decided to best match with the pattern as a part.

Therefore, the present invention is adapted to presume the local cumulative distance in which the several frames before and after m+1 from the obtained minimum cumulative distance $\overline{D}^n(i,J^n)$ are regarded as the initial end point, and thereafter calculate the recurrence formulas (11), (16) or (17), thereby having the same effect as the conventional two level DP. The method of the presumption is that the weighted average of minimum cumulative distance (normalized minimum cumulative distance) between the local pattern T(m+n,i) at the input pattern and the reference pattern $R^n$ is considered about constant at several frames before and after the initial end point m+1 of local pattern (m+1,i), so that the normalized minimum cumulative distance is multiplied by a normalization coefficient of the corresponding asymmetric type (1) when the initial end is represented by m+1+r, thereby obtaining the local cumulative distance $D^n(m+1+r:i)$. In other words, the normalization coefficient when the frame m+1+r is taken as the initial end point with respect to the initial end point m+1 to the $\overline{D}^n(i,j^n)$, is i−{(m+1+r)−1}=i−m−r. Hence, the local cumulative distance to be obtained is given in the following equation:

$$D^n(m + 1 + r:i) = \frac{D^{-n}(i,J^n)}{J^n} * (i - m - r)$$

Hence, the local cumulative distance between the local pattern of input pattern, of which the initial end points are m+1−r to m+1+r and the rearmost end point is i, and the reference pattern is obtained with respect to a predetermined numeral r in the following equations:

$$\left. \begin{array}{l} D^n(m - 1 + r:i) \approx D^{-n}(i,J^n) * \frac{i - m + r}{J^n} \\ \vdots \\ D^n(m + 1 + :i) \approx D^{-n}(i,J^n) * \frac{i - m + r}{J^n} \\ \text{Same as above ?} \quad \vdots \quad \text{Is this (19)?????} \\ D^n(m - r + r:i) \approx D^{-n}(i,J^n) * \frac{i - m + r}{J^n} \\ \vdots \\ m = B^{-n}(i,J^n) - 1 \end{array} \right.$$

The actual processing for the continuous word speech recognition on a basis of the above consideration is as follows. For simplification, explanation will be given on a case of unknown word number. The matching path condition is adapted to use that shown in FIG. 11.

(H1) D(0)=0, B(0)=0
(H2) To execute (H3) to (H6) as to i=1 to I.
(H3) To execute (H4) to (H5) as to n=1 to N.
(H4) (i) To calculate the following recurrence formula as to j=1 to $J^n$: [Calculation of formulas (18-1) and (18-2)
(ii) To presume the local distance as to the local pattern of the input pattern, of which the initial end points are m+1−r through m+1+r and the terminal point is i, as follows: [Calculation of formula (19)] . . .

(H5) $D^n(i) = \min_{m}[D(m) + D^n(m + 1:i)]$ is obtained

When n to satisfy the above formula is represented by n̂, B(i)=$B^{\hat{n}}$(i) and N(i)=n̂.

(H6) $D^n(i) = \min_{n}[D(i)]$ is obtained.

When n to satisfy the above formula is represented by n̂, $B^{\hat{n}}$(i) and N(i)=n̂.
(H7) i=I is put.
(H8) n=N(i).
(H9) When B(i)=0, the process finishes. When B(i)≠0, i=B(i) and the process returns to (8).

A difference from the conventional processing that is characteristic of the invention, is the step (4). Thus, the calculation amount is largely reduced. Next, the reason therefor will be described.

In the formula (18), the minimum cumulative distance $\overline{D}^n(i,j)$ is decided to be optimum as to the initial end point among the paths thereto. Regarding the path passing the lattice point (i,j), the minimum cumulative distance $\overline{D}^n(i,j)$ and initial end pointer $\overline{B}^n(i,j)$ are unchanged in value regardless of whether the path, passing the lattice point, is stationary thereafter as the terminal point or to whichever direction the path proceeds. Hence, when values of the minimum cumulative distance $\overline{D}^n(i,j)$ and initial end pointer $\overline{B}^n(i,j)$ are obtained as to the frame j=1 to J of the reference pattern at every ith input frame as shown in the step (H4), every word can be calculated as the continuous value of the preobtained value, whereby the calculation is once enough per one lattice point. Hence, calculation of distance $d^n(i,j)$ between the vectors is carried out only once [enough] per lattice point.

Accordingly, when the number of lattice points to be calculated is obtained as same as the conventional two level DP, that of the distance between the vectors and that of the minimum cumulative distance both are about N*I*J. Hence, the calculation amount is about 1/(2*r+1) times conventional two level PD, where 2*r+1 is a width of the matching window at the two level DP of the conventional example. In other words, assuming that a length of an analysis frame (an analysis section of speech extracting individual feature vector) is 15 ms, the mean number of frames (as one word of about 500 ms) of the reference pattern is 30 frames and the input pattern permits time variation of 40% in the reference pattern, from r=0.4×30=12 the calculation amount of the present invention is 1/25 in comparison with that of two stage DP of the conventional example, thereby largely reducing the calculation amount.

Figure 14:
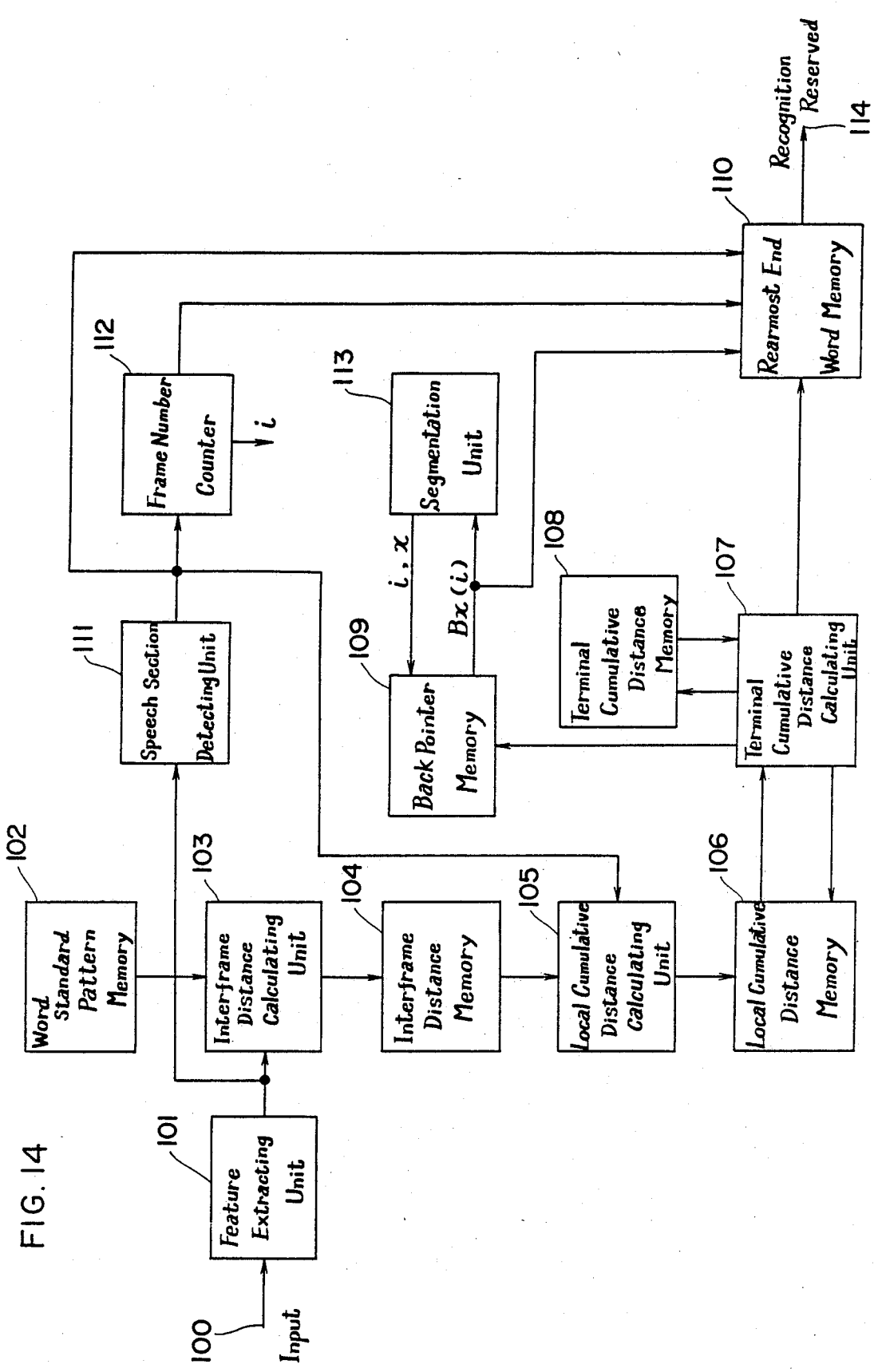
FIG. 14 is a block diagram of an embodiment of a pattern comparison apparatus of the present invention.

FIG. 14 is a functional block diagram showing a speech recognizing apparatus embodying the invention based on the above principle. The present embodiment can be realized with a microphone serving as a speech input unit, a filter bank as a feature extracting unit and a microcomputer as a calculating unit. With reference to FIG. 14, the apparatus will be described in the case where the number of input words is known. Indicated at 100 is an input terminal for speech signals. A feature extracting unit 101 comprising a filter bank or the like converts input speech signals to a feature vector series $a_1, \ldots a_i, \ldots a_I$. A word reference pattern memory unit 102 has stored therein each of N words, the vocabulary to be recognized, as a series of feature vectors. Indicated at 103 is a frame-to-frame distance calculating unit, by which the distance $d^n(i,j)$ between the feature vector $a_i$ in the ith frame of the input and the feature vector of the nth word reference pattern $R^n = b_1^n b_2^n \ldots b_{J^n}^n$ is determined in the ranges of $1 \leq n \leq N$ and $1 \leq j \leq J^n$. $d^n(i,j)$ can be defined, for example, as the city block distance between $a_i$, $a_j$. More specifically, when the dimension of vector is L, $a_i = (a_{i1}, a_{i2}, \ldots a_{iL})$ and $b_j^n = (b_{j1}^n, b_{j2}^n, \ldots b_{jL}^n)$, $$d(i,j) = \sum_{l=1}^{L} |a_{il} - b_{jl}^n|$$

A frame-to-frame distance memory unit 104 stores the frame-to-frame distance until it becomes unnecessary. Indicated at 105 is a local cumulative distance calculating unit, by which for example when the path restricting condition is the one shown in FIG. 11a, the recurrence formulas (18-1) and (18-2) are calculated, and the local cumulative distance $D^n(m:i)$ is determined from equation (19) for $m-r+1 \leq m' \leq m+r+1$ in the range of m'. A unit 106 stores this local cumulative distance unit it becomes unnecessary. A terminal end cumulative distance calculating unit 107 calculates $D_x(i)$, $N_x(i)$, $B_x(i)$ according to the recurrence formula (16) from the contents of the local culumative distance memory 106 and the contents of a terminal end cumulative distance memory 108. The memory 108 stores the terminal end cumulative distance $D_x(i)$ calculated by the unit 107 until it becomes unnecessary. The $D_x(i)$ is used for the calculation of the recurrence formula (16) by the unit 107. A back pointer memory 109 stores the back pointer $B_x(i)$ calculated by the unit 107. A rearmost end memory 110 stores the rearmost end word in the ith frame determined by the unit 107. A speech section detecting unit 111 detects the speech section from the magnitude or the like of input signals. When the unit 111 detects the start of speech input, a frame number counter 112 starts to count up for each frame. While the foregoing process is for the ith frame, the count on the counter 112 sets the i. Accordingly, the same process as above is executed every time one frame advances. The counter 112 stores counting upon detection of the speech section and is reset when the speech section is completed. $N_x(i)$ and $B_x(i)$ are stored for $i = 1, 2, \ldots, I$ in the rearmost end word memory 110 and the back pointer memory 109. A segmentation unit 113 gives the back pointer memory 109 a command for reading out a specified back pointer. Thus, when the unit 113 feeds a value i and x to the memory 109, back pointer $B_x(i)$ is read from the memory 109. Upon receiving the value $B_x(i)$ from the memory 109, the unit 113 gives the same value to the memory 109 as a new value of i and a new value of $x = x - 1$. Accordingly when the speech section detecting unit 111 detects the completion of speech section, the final value I on the counter 112 is fed to the segmentation unit 113, which in turn first gives the value I and X to the back pointer memory 109. In accordance with the operation already described, the back pointer memory 109 thereafter successively affords outputs of $B_x(i)$, $B_{x-1}(B_x(I)) \ldots, 0$. These values are the frame at the end of second word from the last, the frame at the end of third word from the last, the frame at the end of the fourth word from the last, . . . . Since $N_x(i)$ is the word terminating with ith frame, recognition result will be obtained in the reverse order from the last word when the value is given to the rearmost end word memory 110 as it is. To reverse this order (to the usual order), the change of order is given to the output from the memory 109 or to the output of the memory 110.

FIGS. 15 to 20 are flow charts for illustrating the details of the process in each block of the block diagram of FIG. 14.

Figure 15:
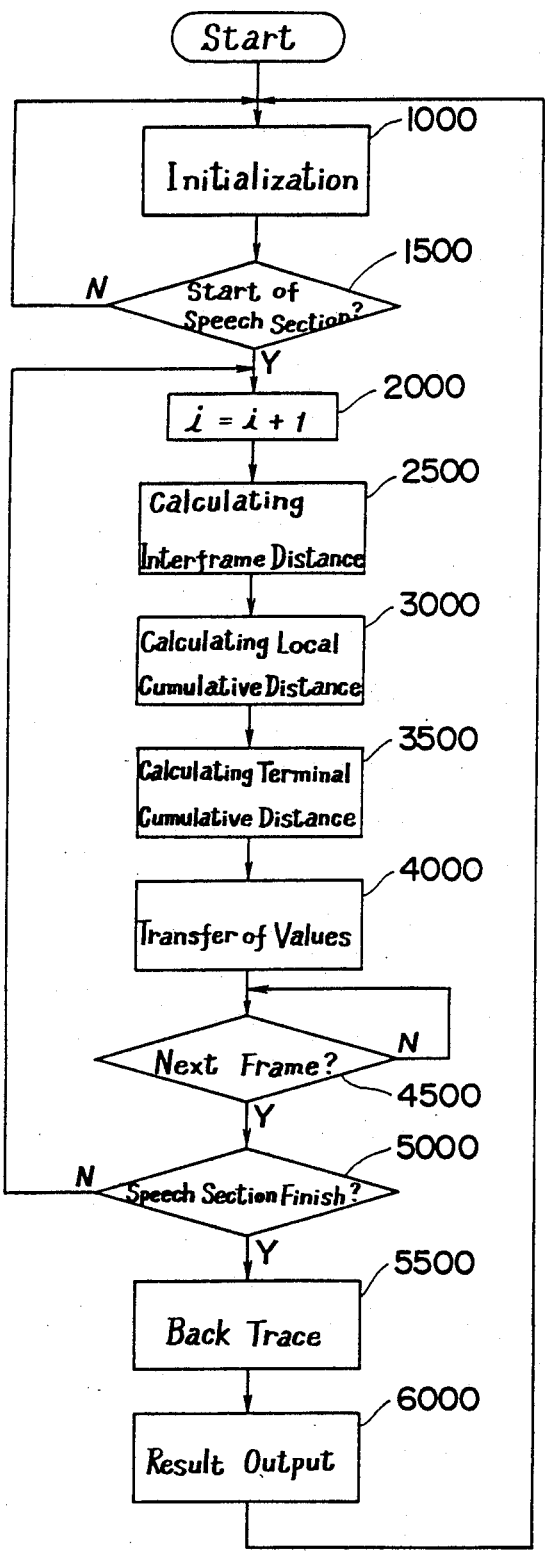
FIG. 15 is a flow chart with respect to the embodiment in FIG. 14, FIGS. 16, 17a, 17b, 18a, 18b, 19a, 19b and 20 are flow charts explanatory in detail of the processing of each part in a first embodiment of the present invention.

FIG. 15 shows the flow of the overall process. Before the calculation of the recurrence formula (18-1) (18-2), step 1000 initializes the local cumulative distance $\overline{D}^n(i,j)$, terminal end cumulative distance $D_x(i)$, terminal end back pointer $B_x(i)$, a counter in the frame number counter unit, etc. The initialization is effected before the detecting unit 111 detects the start of a speech section. In step 1500, the detecting unit 111 detects the start of the section as already stated. Step 2000, which counts up frames, shows the operations to be performed by the frame number counter 112. Step 2500 which calculates frame-to-frame distances, shows the operation to be performed by the frame-to-frame distance calculating unit 103 and the frame-to-frame distance memory 104. Step 3000 for calculating local cumulative distance shows the operation to be performed by the local cumulative distance calculating unit 105 and the local cumulative distance memory 106. Step 3500 for calculating terminal end cumulative distances shows the operation to be performed by the terminal end cumulative distance calculating unit 107, the terminal end cumulative distance memory 108, the back pointer memory 109 and the rearmost end word memory 110. As to intermediate cumulative distance $\overline{D}^n(i,j)$ and intermediate back pointer $\overline{B}^n(i,j)$, those for only the present frame, the first preceding frame from the present and the second preceding frame from the present, i.e. three frames only, may be stored in practice in the case of the recurrence formula (18-1)(18-2). Accordingly, step 4000 is such that when the process for the present frame has been finished, the value for the first preceding frame is transferred to the stored location for the second preceding frame, and the value for the present frame is transferred to the storage location for the first preceding frame. This operation is performed in the local cumulative distance memory 106. Steps 2000 to 4000 are performed for every frame. Step 4500 detects arrival of the next frame by detecting a frame pulse within the frame number counter unit 112. Step 5000 detects finish of the speech section and shows the operation to be performed by the speech section detecting unit 111. The start and finish of the speech section is effected by conventional technique. When the finish of the speech section is not detected, the sequence is repeated again from step 2000 for a new frame. Upon detection of the finish of the speech section, step 5500 performs back track. This step shows the operation to be performed by the back pointer memory 109, the segmentation unit 113 and the rearmost end word memory 110. Step 6000 delivers the result of recognition by usual means, which is not shown in FIG. 11.

FIG. 16 shows the details of the initialization step 1000. The initialization of $\overline{D}^n(3,j) = \infty$ and $\overline{D}^n(2,j) = \infty$ are performed with respect to $D_0(0) = 0$, $B_0(0) = 0$, $n = 1, \ldots, N$; first preceding frame from the present and the second preceding frame from the present, i.e. three frames, may be stored as already stored. $\overline{D}^n(3,j)$ means the value for the second preceding frame, $\overline{D}^n(2,j)$ means the value for the first preceding frame, and $\overline{D}^n(1,j)$ means the value for the present frame.

FIGS. 17a and 17b show an example of calculating the frame-to-frame distance in step 2500. In step 2550, the frame-to-frame distance is represented by $d^n(j)$. The frame-to-frame distance $d^n(i,j)$ to be used for the calculation of the recurrence formula (18-1) is necessary only for the frame for which calculation is being conducted, so that there is no need to store such distance for various i values. For each frame, $d^n(j)$ is calculated as a city block distance in respect of $n = 1, \ldots, N$ and $j = 1, \ldots, J^n$. FIG. 17b shows how to determine $d^n(j)$ for individual n and j shown in step 2550 of FIG. 17a.

FIGS. 18a and 18b show the details of calculation of the local cumulative distance in step 3000. As to the intermediate cumulative distance $\overline{D}^n(i,j)$ of the recurrence formula (18-1)(18-2) and back pointer $\overline{B}^n(i,j)$ attendant thereto, those for the present frame, first preceding frame; and when $i' = 3$, the values for the second preceding frame. Further the local cumulative distance $D^n(s:t)$ may be stored only when t relates to the frame presently being processed, hence the representation of $D^n(s)$. Steps 3010, 3020 and 3130 show that the calculation of local cumulative distance of step 3030 to step 3120 is performed for $n = 1, \ldots, N$. Step 3030 gives initial values for the calculation of the recurrence formula (18-1)(18-2) for each n. Step 3040 to step 3080 calculate the intermediate cumulative distance $\overline{D}^n(1,j)$ and intermediate back pointer $\overline{B}^n(1,j)$ for $j = 1, \ldots, J^n$. $i'(1 \leq i' \leq 3)$ for giving a minimum value for $\overline{D}^n(i',j-1)$ is determined as $\hat{i}'$, to obtain $\overline{D}^n(1,j) = \overline{D}^n(\hat{i}', j-1) + d^n(j)$ and $\overline{B}^n(i,j) = \overline{B}^n(\hat{i}, j-1)$. FIG. 18b shows an example of calculation of step 3060. In step 3090 to step 3120, the local cumulative distance $\overline{D}^n(i,J^n)$, determined as an amount with which the normalizing coefficient (sum of weights along the matching path) is dependent on the reference pattern length, is converted to an amount the normalizing coefficient of which is dependent only on the input pattern length. These steps also calculate an estimated value of local cumulative distance when r frames before and after the back pointer $\overline{B}^n(1, J^n)$ are each used as the starting end point of the matching path for the reference pattern n. Accordingly these steps give the local cumulative distance $D^n(s)$ when each frame s of the back pointer leading to D (1,J) and r frames before and after the same, i.e. $r_1 + r_2 + 1$ frames, serves as the starting end point.

Figure 19A:
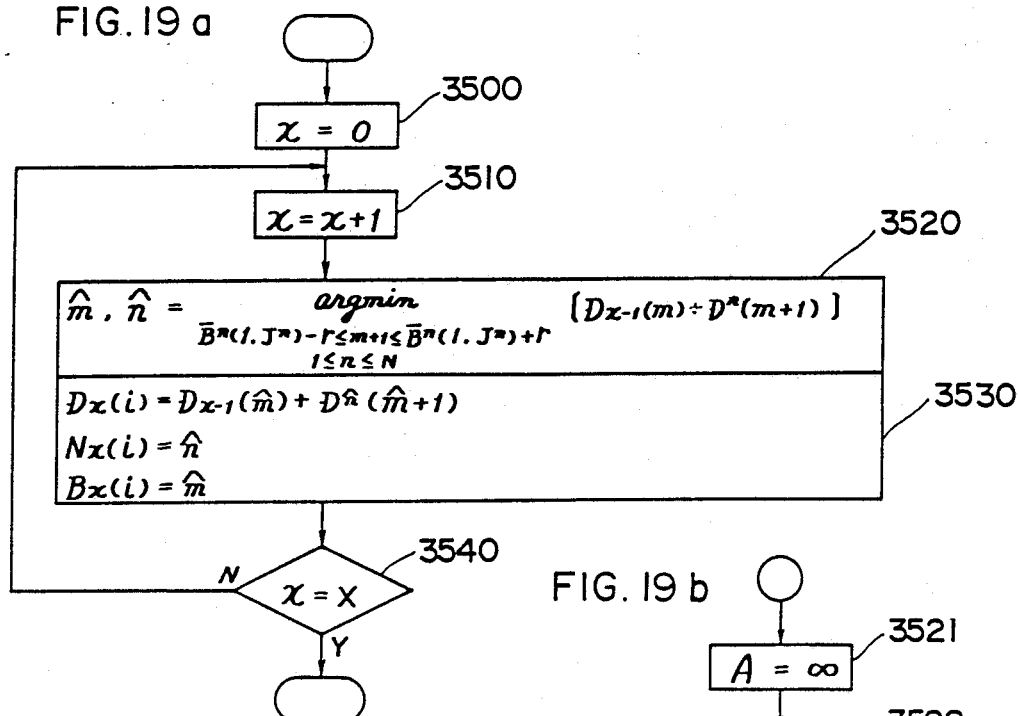
Figure 19B:
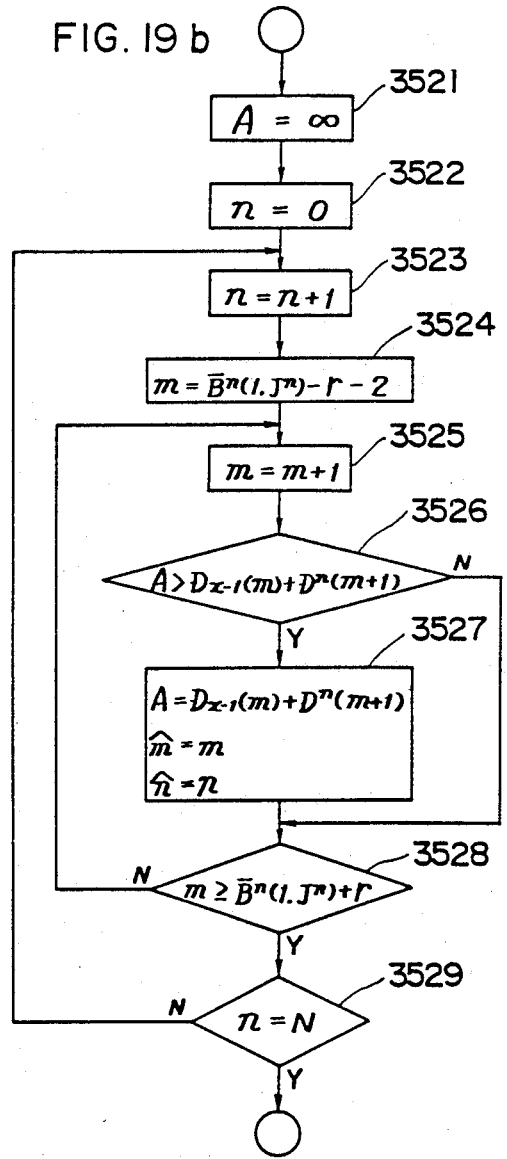

FIGS. 19a and 19b show the details of the process of step 3500 for determining the terminal end cumulative distance $D_x(i)$, terminal end back pointer $B_x(i)$ and rearmost end word $N_x(i)$ in respect of $x = 1, \ldots, X$. Step 3520 determines, as $\hat{m}$ and $\hat{n}$, m and n which minimize the sum of the terminal end cumulative distance $D_{x-1}(m)$ and local cumulative distance $D^n(m+1)$ when it is assumed that there are $x-1$ words for the frames up to the mth, m being in the range of the starting end frame. FIG. 19b shows an example of specific method thereof. Step 3530 calculates $Dx(i) = D_{x-1}(\hat{m}) + D^{\hat{n}}(\hat{m}+1)$, $Nx(i) = \hat{n}$ and $Bx(i) = \hat{m}$ from m and n thus determined in step 3520.

FIG. 20 shows the details of step 4000. For the intermediate cumulative distance $\overline{D}^n(i',j)$ and intermediate back pointer $\overline{B}^n(i',j)$, storage locations are changed in preparation for the next frame as shown in step 4050.

Figure 7:
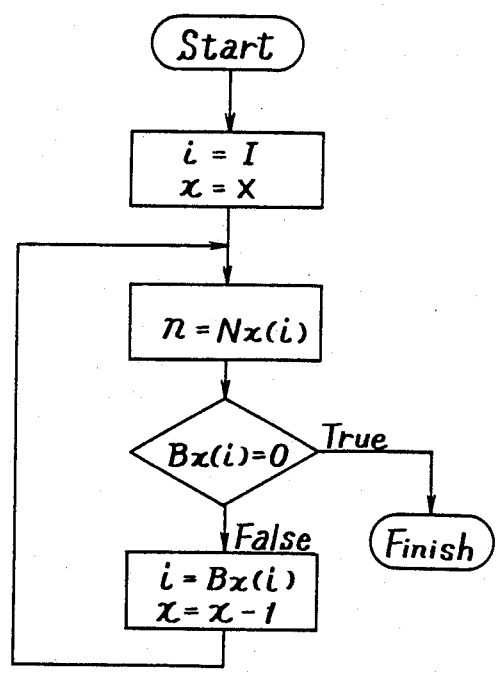
FIGS. 6, 7 and 9 are flow charts showing a method for obtaining words in the reverse order from the rearmost one to the first.
Figure 4:
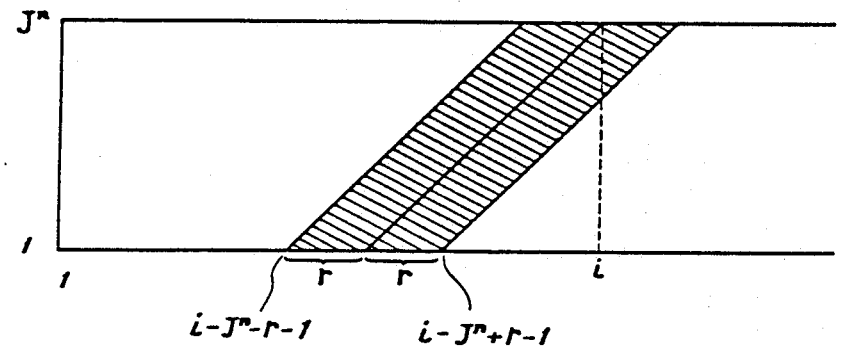
FIGS. 4 and 5 are illustrations explaining the conventional continuous word speech recognition method.
Figure 5:
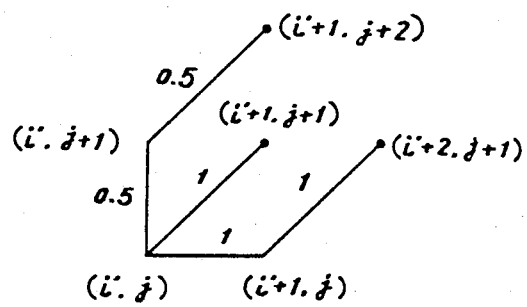
Figure 8:
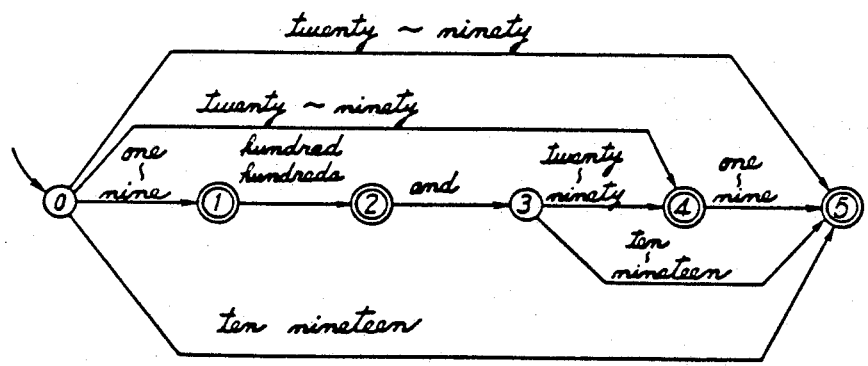
FIG. 8 is a view exemplary of the automaton expression regarding an input of the continuous word speech recognition by the automaton control.
Figure 6:
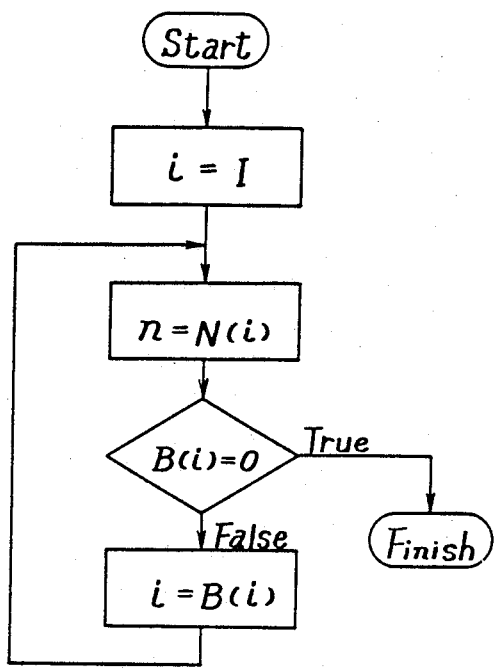
Figure 9:
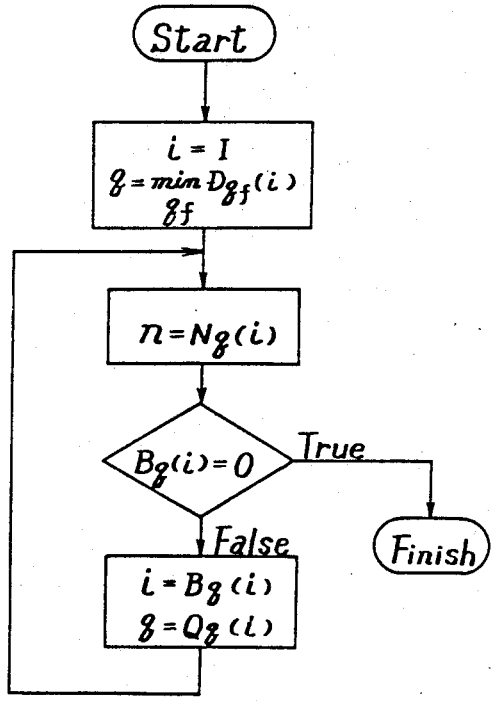

Immediately after the finish of the speech section, step 5500 of FIG. 15 follows the procedure already stated to determine the words to be recognized in a reverse order based on the above-mentioned $B_x(i)$ and $N_x(i)$ using the initial values of $x = X$ and $i = I$. Thus the operation described with reference to FIG. 7 is performed.

Figure 21:
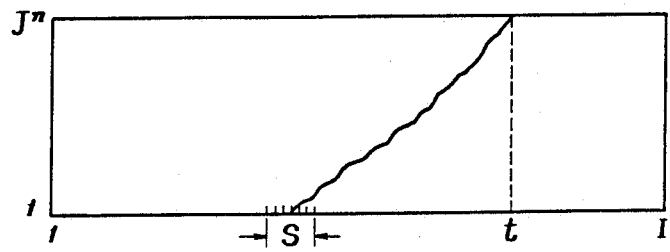
FIGS. 21 and 22 are views explanatory of the principle of improvement in the first embodiment.

FIG. 21 shows how to select the starting end when $D^n(s:t)$ is determined by matching with the reference pattern n according to the present embodiment. The portion indicated at s is the range from which the starting end is selected. Inherently s is the range of several frames before and after the starting end which appears to be optimum. Although a satisfactory result appears achievable with this, the starting end will be selectable from a wider range, whereby a pattern comparing apparatus of higher precision can be realized. This can be realized by determining a plurality of starting ends s which appear optimal.

Suppose $\overline{D}^n(i,j,k)$ is the kth minimum value, with respect to m, of minimum cumulative distances between $m+1$ to i frames of the input pattern and 1 to j frames of the reference pattern n, and $\overline{B}^n(i,j,k)$ is the starting end position of the input pattern satisfying $\overline{D}^n(i,j,k)$. It is noted that $$\overline{D}^n(i,j) = \overline{D}^n(i,j,1), \ \overline{B}^n(i,j) = \overline{B}^n(i,j,1)$$

$$\overline{D}^n(i,j,1) \leq \overline{D}^n(i,j,2) \leq \ldots \leq \overline{D}^n(i,j,k)$$

$$\overline{D}^n(i,j,k) \neq \overline{B}^n(i,j,h) \ \text{for} \ k \neq h$$

Accordingly $\overline{D}^n(i,J^n,k)$ and $\overline{B}^n(i,J^n,k)$ are determined for $K = 1, 2, \ldots, K$ under the condition of $\overline{B}^n(i,j,k) \neq \overline{B}^n(i,j,h)$ for $K \neq h$, and the width of r frame before and after each starting end point $\overline{B}^n(i,J^n,k)$ is used as the possible starting end point.

Figure 22:
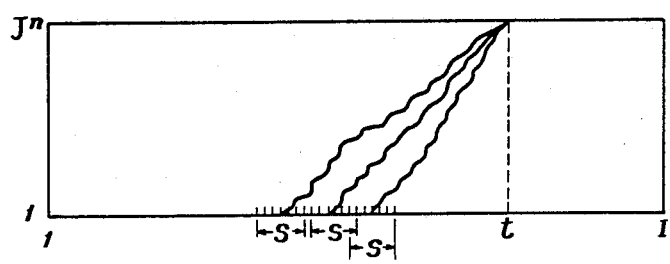

FIG. 22 shows the range of starting end points thus determined. $K = 3$ in the present case.

$D^n(s:t)$ is calculated as follows from the $\overline{D}^n(i,j,k)$ thus obtained, with respect to $k = 1, 2, \ldots, K$ and $r' = 0, 1, 2, \ldots, r$.

$$\left. \begin{array}{l} D(m - r' + 1:i) = D^{-n}(i,J^n,k) \dfrac{i - m + r'}{J^n} \\ \\ D(m + r' + 1:i) = D^{-n}(i,J^n,k) \dfrac{i - m - r'}{J^n} \end{array} \right] \quad (20)$$

The condition of $\overline{B}^n(i,j,h) \neq \overline{B}^n(i,j,k)$ for $k \neq h$ is herein used because it is meaningless to select starting end points which are the same. If the plurality of sections determined from equations (20) lap over each other, the lap may be eliminated by selecting the one with which the local cumulative distance is smaller, or by making $\overline{B}^n(i,j,k)$ less than $\overline{B}^n(i,j,h) - r$ or greater than $\overline{B}^n(i,j,k)+r$. An improved apparatus can be provided which is exactly th same as the embodiment of FIG. 14 in construction and operation except that the operation of the local cumulative distance calculating unit 105 is changed as above and that the range of starting end point m+1 is changed to $$[\overline{B}^n(i,J^n,k)]-r \leq m+1 \leq [\overline{B}^n(i,J^n,k)]+r$$

for k=1,2, ..., K in the calculation of cumulative distance by the terminal end cumulative distance calculating unit 107. K=1 in the case of the embodiment of FIG. 14.

FIGS. 23 to 27 show how the operation of each block of the embodiment shown in FIG. 14 is modified by the improvement. In this embodiment, as in the foregoing embodiment, $d^n(j)$ represents $d^n(i,j)$ for the frame which is being processed presently. As to i' in $\overline{D}^n(i',j,k)$ and $\overline{B}^n(i',j,k)$, i'=1 means the value for the presently processed frame, i'=2 means the value for the first preceding frame from the present frame, and i'=3 means the value for the second preceding frame from the present.

FIG. 23 shows the process to be executed by step 1000 of FIG. 15 in detail. The process differs from that in the foregoing embodiment in that the element k is added to the intermediate cumulative distance. The distance $D^n(i',j,k)$ is initialized also with respect to each k value.

The frame-to-frame distance is determined exactly in the same manner as in the foregoing embodiment.

Figure 24:
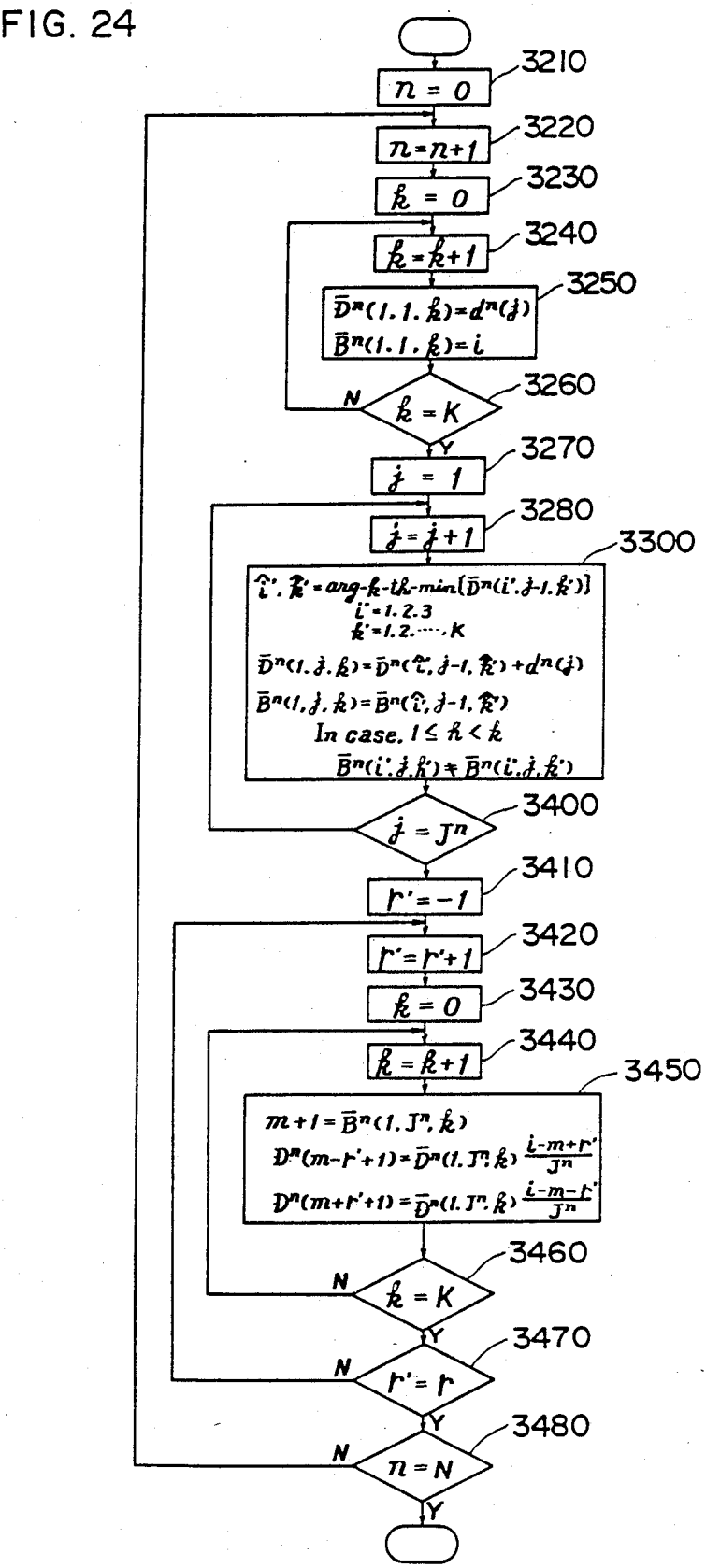

FIG. 24 shows in detail the process to be executed by step 3000 of calculating the local cumulative distance. The process corresponding to step 3030 in FIG. 18 is modified as shown by step 3230 to step 3260. The process corresponding to steps 3060 and 3070 is modified as shown by step 3300. The process corresponding to step 3110 is so modified as shown by step 3430 to step 3460. The expression $$\hat{i}', \hat{k}' = \arg-k-\text{th}-\min [\overline{D}^n(i', j-1, k')]$$

$$i' = 1,2,3$$

$$k' = 1,2,\ldots, K$$

in step 3300 means that i' and k' giving the kth minimum value of $\overline{D}^n(i',j-1, k')$ for i'=1,2,3 and k'=1,2, ..., K are j' and k'.

Figure 25:
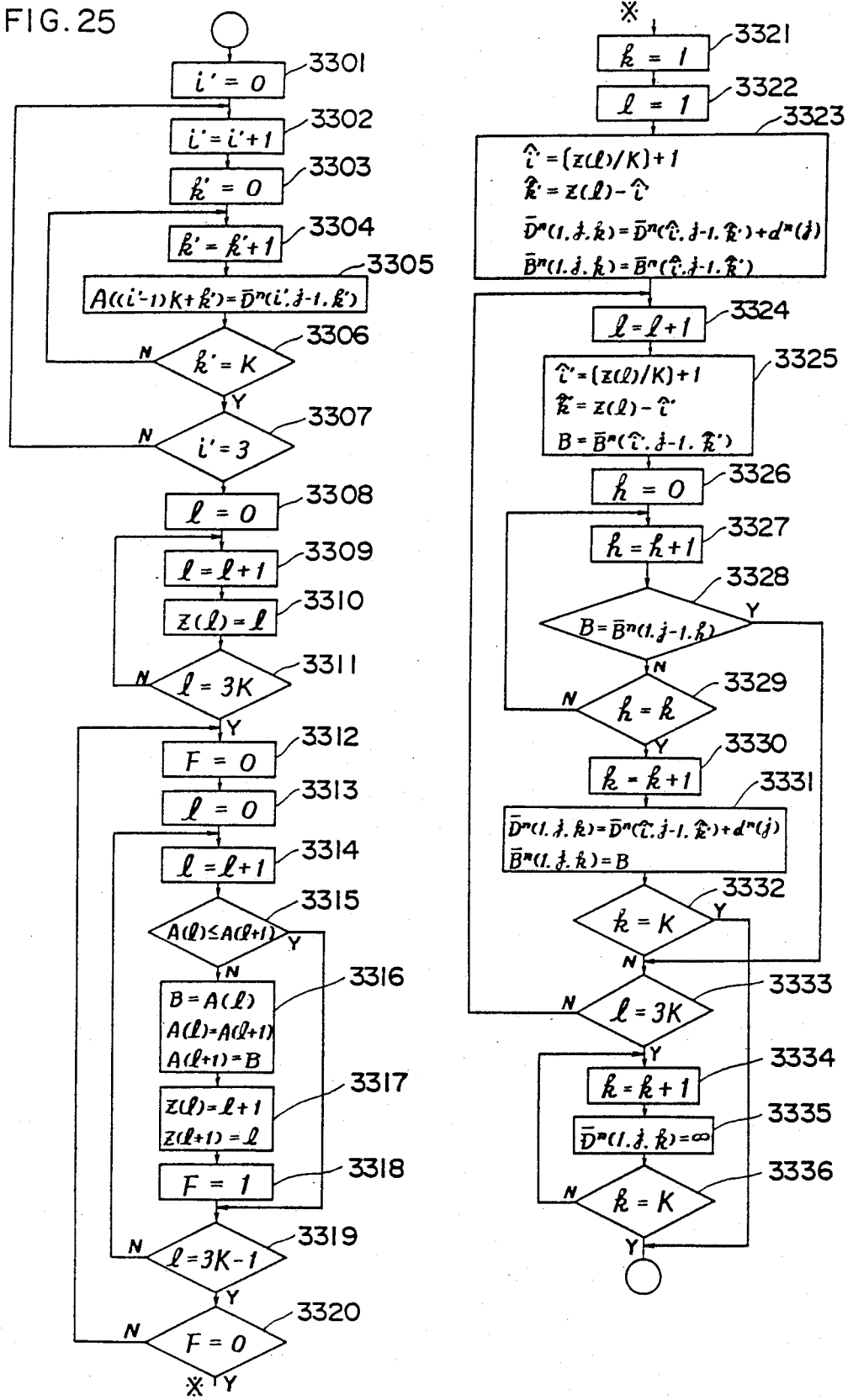

FIG. 25 shows step 3300 in greater detail. In step 3301 to step 3307, the intermediate cumulative distance $\overline{D}^n(i',j-1, k')$ for i'=1,2,3 and k'=1,2, ..., K is successively pre-substituted in $A((i'-1)K+k')$. Step 3308 to step 3320 arrange the contents of A(l) in increasing order from small to large. A(l) is compared with A(l+1); if A(l)≤A(l+1), these values are left as they are, whereas if A(l)>A(l+1), A(l) and A(l+1) are replaced by each other. This procedure is repeated until the relationship of A(l)≤A(l+1) is established for every l(=1, ..., 3K−1), whereby the above process is executed. Step 3308 to step 3311 presubstituted l in z(l). When A(l) and A(l+1) are replaced by each other in step 3316, z(l) is made equal to l+1 and z(l+1) to l in step 3317, whereby when the above arrangement is completed, step 3305 finds that A(p) is at the lth position when z(l)=p. A flag F is used to indicate whether A(l)≤A(l+1) has been established for every l(=1, ..., 3K−1). Thus, F is set to 0 in step 3312 before the arrangement procedure, and F is set to 1 in step 3318 when arrangement is made. If F is then found to be 1 in step 3320, this means that the arrangement has been made at least once for l=1, ..., 3K−1. F=0 shows that no arrangement has been made, indicating that A(l)≤A(l+1) has been established for every l(=1, ..., 3K−1). When this procedure has been completed, the lth intermediate cumulative distance $\overline{D}^n(i',j-1,k')$ from the minimum is equal to A(l), and z(l)=(i'−1)K+k', so that the corresponding i' and k' are given by $\hat{i}' = [z(l)/K]+1$ and $\hat{k}' = z(l)-\hat{i}$ where [X] shows the integer portion of X. Step 3323 determines i' and k' corresponding to the minimum value A(1) of $\overline{D}^n(i',j-1k')$ and determines $\overline{D}^n(i',j,1)$ and $\overline{B}^n(1,j,1)$ from the resulting values. Step 3324 et. seq. determine $\overline{D}^n(1,j-1,k)$ and $\overline{B}^n(1,j-1,k)$ for k=2,..., K under the condition of $\overline{B}^n(1,j-1,k) \neq \overline{B}^n(1,j-1,h)$ (when k≠h). Step 3325 determines, as $\hat{i}$ and $\hat{k}$, i' and k' corresponding to A(l) as already described. Steps 3326 to 3329 are such that step 3328 checks whether $\overline{B}^n(\hat{i}',j-1,\hat{k}')$ determined in step 3325 is equal to the previously obtained $\overline{B}^n(1,j-1,h)$ in order to certainly establish $\overline{B}^n(1,j-1,k) \neq \overline{B}^n(1,j-1h)$ when k≠h, and if the two are equal, the value of step 3325 already obtained is discarded to repeat 3325 again for the next l value. If the two are not equal, $\overline{D}^n(i,j,k) = \overline{D}^n(\hat{i}',j-1,\hat{k}')+d^n(j)$ and $\overline{B}^n(1,j,k) = \overline{B}^n(\hat{i}',j-1,\hat{k}')$ as the kth minimum value in steps 3330 and 3331. When up to the kth minimum values are obtained by similar procedures, step 3332 finds that $\overline{D}^n(1,j,k)$ and $\overline{B}^n(1,j,k)$ have been determined for every k(=1, ..., K). Step 3334 to step 3336 are the process to be executed when up to the kth minimum values of $\overline{D}^n(1,j,k)$ are not obtainable by repeating the above procedure for l of up to 3K. $\overline{D}^n(1,j,k)=\infty$ is used for the unobtainable values.

Figure 26:
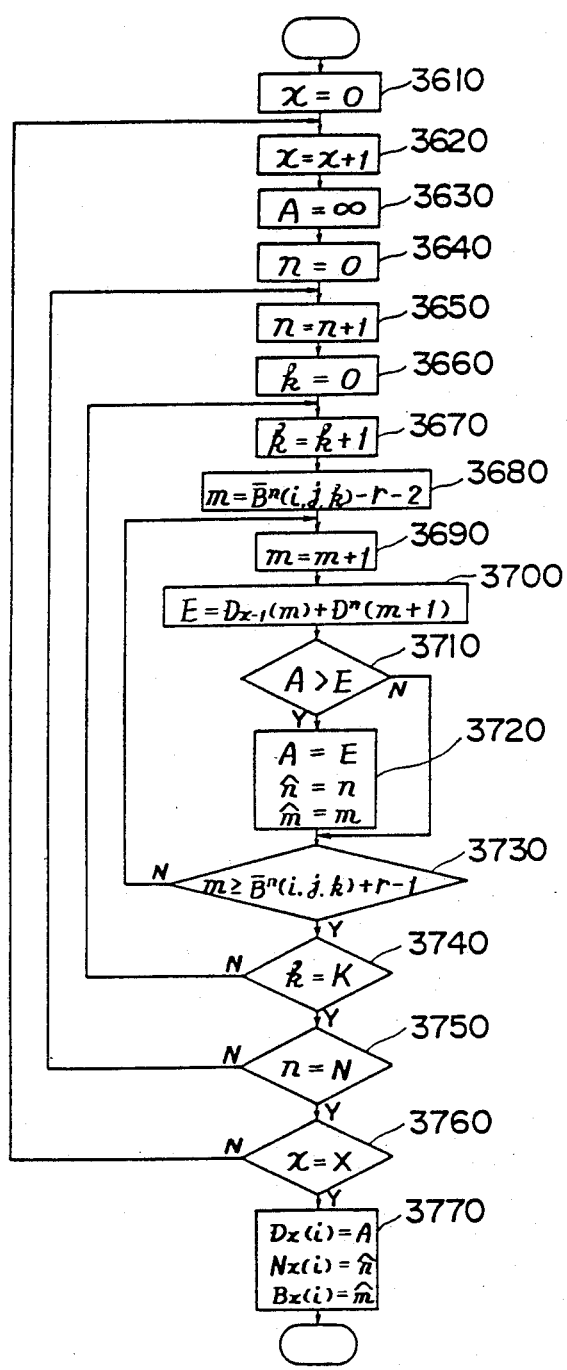

FIG. 26 corresponds to FIG. 19. The range of m for determining minimum values of $D_{x-1}(m)+D^n(m+1)$ in respect of m and n is made larger in the second embodiment than in the first embodiment by giving consideration to the possible values of up to the kth.

Figure 27:
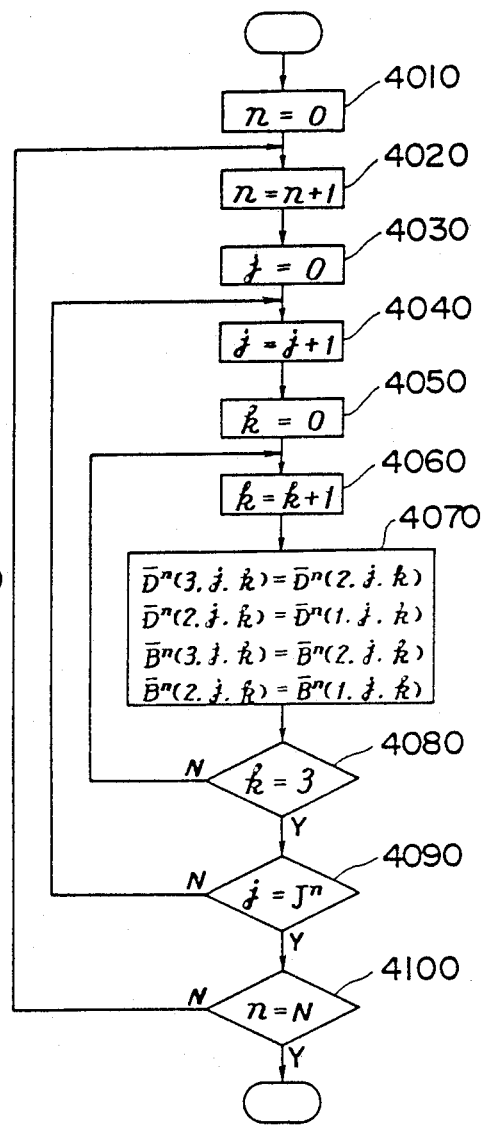

FIG. 27 corresponds to FIG. 20 and differs therefrom only in that the element of k is added.

Although embodiments of the present invention have been described above with reference to the case wherein the number of input words is known, it will be apparent from the foregoing description that the invention is applicable also to the case wherein the number of input words is not known and to the case wherein automaton control is resorted to.

Although the matching path restricting condition has been described with reference to FIG. 11a in the above embodiments, the condition shown in FIG. 11b is used in practice. In this case, the cumulative distance $\overline{D}^n(1,j,k)$ and back pointer $\overline{B}^n(i,j,k)$ at the lattice point (i,j) are obtained as follows:

$$D^{-n}(i,j,k) = \min_{1 \leq k_1,k_2 k_3 \leq k} \begin{bmatrix} D^{-n}(i-2,j-1,k_1) + d^n(i,j) \\ D^{-n}(i-1,j-1,k_2) + d^n(i,j) \\ D^{-n}(i-1,j-2,k) + d^n(i,j-1) + d^n(i,j) \end{bmatrix}$$

$$B^{-n}(i,j,k) =$$

$$\left[\begin{array}{l} B^{-n}(i-2,j-1,k_1)\ldots \text{ when } D^{-n}(i,j,k) = \\ \qquad D^{-n}(i-2,j-1,k_1) + d^n(i,j) \\ B^{-n}(i-1,j-1,k_2)\ldots \text{ when } D^{-n}(i,j,k) = \\ \qquad D^{-n}(i-1,j-1,k_2) + d^n(i,j) \\ B^{-n}(i-1,j-2,k_3)\ldots \text{ when } D^{-n}(i,j,k) = \\ \qquad D^{-n}(i-1,j-2,k_3) + d^n(i,j-1) + \\ \qquad d(i,j) \end{array}\right]$$

Although the above embodiments have been described with reference to the case wherein speeches are recognized, the invention is not limited to the recognition of speeches but is applicable also to the recognition of other continuous patterns represented by feature vector series.

Thus, the present invention realizes a pattern comparing apparatus by which continuous word speeches can be recognized with exceedingly smaller amount of calculation than heretofore possible and which is useful even when the number of words is unknown, the apparatus further being adapted to specify the number of words and to perform automaton control.

Table 1 shows the results of a recognition experiment conducted with use of the pattern comparing apparatus of the present invention. The male adults randomly pronounced 100 three-digit continuous rows of numerals. The speech was passed through 4.4 kHz LPF, then sampled at 10 kHz, converted to 12-bit symbols and multiplied by a Hamming window of 25.6 ms to obtain 14-dimensional FFT Cepstrum (The feature vectors are 14-dimensional vectors). The frame period was 10 ms. City block distance was used as frame-to-frame distance.

With the present experiment, the number of digits of the input was unknown, and $K=1$. The column "segment" shows the ratio of the recognition results wherein the number of digits (number of words) recognized matched the number of digits of the input. It is seen that the present apparatus is comparable in ability to the conventional apparatus (adapted for 2-stage DP method). Although the local cumulative distance in the embodiments is estimated for the case wherein the range of starting end points is from $\overline{D}^n(i, J^n)$ to each of r frames before and after $\overline{B}^n(i,J^n)$, the range of starting end points for estimating the distance more generally in the present experiment is the frames of $\overline{B}^n(i, J^n) - r_1$ to $\overline{B}^n(i,J^n) + r_2$.

What is claimed is:

1. A pattern comparing apparatus comprising;

first means for converting each of input signals to an input pattern comprising a series of feature vectors, each input feature vector being produced at every frames each of which corresponds to a constant time unit of the input signal;

second means for calculating a vector-to-vector distance as a frame-to-frame distance between a frame of said input pattern and a frame of a reference pattern, said vector-to-vector distance indicating the degree of similarity between the input feature vector of the ith frame of each input pattern and a feature vector of the jth frame of said reference pattern;

third means for calculating $$D(i) = \min_{m,n}[D(m) + D^n(m + 1:i)]$$

regarding $i=1$ to I where $D(0)=0$, and memorizing m as a back pointer $B(i)$ and n as the rearmost reference pattern name $N(i)$ when each $D(i)$ is calculated, where, $D(i)$ represents th sum of frame-to-frame distance between the local pattern of the first to the ith frames of the input pattern and a reference pattern or a combination pattern of a plurality of reference patterns, $D(m)$ represents the sum of frame-to-frame distance between the local pattern of the first to the mth $(m<i)$ frames of the input pattern and a reference pattern or a combination pattern of a plurality of reference patterns, $D^n(m+1;i)$ represents a local cumulative distance which is a pattern-to-pattern distance between the local pattern of $m+1$ to ith frames of the input pattern and the nth reference pattern, and n represents a number given to said reference pattern;

fourth means for calculating said local cumulative distance $D^n(m+1;i)$ by calculating by a dynamic programming method on an i-j plane whose abscissa is the frame numbers i of the input pattern and whose ordinate is the frame number of the reference pattern, a matching path whose starting point is $(m+1,1)$ determined with respect of i and terminating point is $(i,J^n)$, in which the sum of the product of said frame-to-frame distance and weight

TABLE 1

| | | Results of Experiment of Recognizing Continuous Numerical Speech (%) | | | | | | | | |
|---|---|---|---|---|---|---|---|---|---|---|
| | | SN | | | HY | | | TU | | |
| Speaker | | Numeral | | | Numeral | | | Numeral | | |
| * | $r_1$ | $r_2$ | Numeral | row | Segment | Numeral | row | Segment | row | Numeral | Segment |
| 1 | 0 | 0 | 99.3 | 98.0 | 100. | 92.3 | 67.0 | 85.0 | 96.0 | 82.0 | 94.0 |
| 1 | 1 | 1 | 99.3 | 97.0 | 99.0 | 92.3 | 68.0 | 88.0 | 95.3 | 83.0 | 96.0 |
| 1 | 2 | 2 | 99.3 | 97.0 | 99.0 | 92.0 | 68.0 | 89.0 | 95.3 | 83.0 | 95.0 |
| 1 | 3 | 3 | 99.3 | 97.0 | 99.0 | 93.0 | 70.0 | 88.0 | 95.7 | 84.0 | 95.0 |
| 1 | 3 | 0 | 99.3 | 98.0 | 100. | 93.0 | 68.0 | 85.0 | 95.7 | 84.0 | 97.0 |
| 1 | 0 | 3 | 99.3 | 96.0 | 98.0 | 94.3 | 76.0 | 91.0 | 95.7 | 79.0 | 89.0 |
| 2 | 3 | 3 | 100. | 99.0 | 99.0 | 95.3 | 74.0 | 85.0 | 97.7 | 91.0 | 98.0 |
| 1 | Two-stage DP method | | 99.7 | 95.0 | 95.0 | 95.0 | 82.0 | 96.0 | 96.3 | 76.0 | 85.0 |
| 2 | Two-stage DP method | | 100. | 92.0 | 92.0 | 96.3 | 88.0 | 95.0 | 99.0 | 90.0 | 92.0 |

* Number of reference pattern per numeral.

along said path is minimum, and memorizing said sum of the product of said frame-to-frame distance and weight with respect of said m, where $J^n$ represents frame number of reference pattern n, said matching path represents a path connecting corresponding points, said corresponding point represents a point for indicating which frame-to-frame distance between the input pattern and the reference pattern should be calculated, and said weight depends on the types of the path from the first preceding corresponding point to present corresponding point, the sum of said weight along the matching path being dependent only on the length of the pattern; and fifth means for determining a reference pattern sequence corresponding to the input pattern in a reverse order to the input using said back pointer B(i) and the rearmost reference pattern name N(i); characterized in that said fourth means comprises;
  (1) means for obtaining only one path by minimizing as to m, the sum of said weight along the matching path being dependent only on the length of the reference pattern,
  (2) means for normalizing the sum of the products of said frame-to-frame distance and weight by the sum of said weight along the matching path, and
  (3) means for calculating the local cumulative distance for a plurality of local input patterns having different frame lengths by multiplying said normalized sum of the products of said frame-to-frame distance and weight by a first frame number of said local input pattern and by a second frame number obtained by adding a number to or by subtracting a number from said first frame number.

2. A pattern comparing method comprising;

a first step for converting each of input signals to an input pattern comprising a series of feature vectors, each input feature vector being produced at every frames each of which corresponds to a constant time unit of the input signal;

a second step for calculating a vector-to-vector distance as a frame-to-frame distance between a frame of said input pattern and a frame of a reference pattern, said vector-to-vector distance indicating the degree of similarity between the input feature vector of the ith frame of each input pattern and a feature vector of the jth frame of said reference pattern;

a third step for calculating $$D(i) = \min_{m,n}[D(m) + D^n(m+1:i)]$$

regarding i=1 to I where D(0)=0, and memorizing m as a back pointer B(i) and n as the rearmost reference pattern name N(i) when each D(i) is calculated, where, D(i) represents the sum of frame-to-frame distance between the local pattern of the first to the ith frames of the input pattern and a reference pattern or a combination pattern of a plurality of reference patterns, D(m) represents the sum of frame-to-frame distance between the local pattern of the first to the mth (m<i) frames of the input pattern and a reference pattern or a combination pattern of a plurality of reference patterns, $D^n(m+1;i)$ represents a local cumulative distance which is a pattern-to-pattern distance between the local pattern of m+1 to ith frames of the input pattern and the nth reference pattern, and n represents a number given to said reference pattern;

a fourth step for calculating said local cumulative distance $D^n(m+1;i)$ by calculating by a dynamic programming method on an i-j plane whose abscissa is the frame numbers i of the input pattern and whose ordinate is the frame number of the reference pattern, a matching path whose starting point is (m+1,1) determined with respect of i and terminating point is $(i,J^n)$, in which the sum of the product of said frame-to-frame distance and weight along said path is minimum, and memorizing said sum of the product of said frame-to-frame distance and weight with respect of said m, where $J^n$ represents frame number of reference pattern n, said matching path represents a path connecting corresponding points, said corresponding point represents a point for indicating which frame-to-frame distance between the input pattern and the standard pattern should be calculated, and said weight depends on the types of the path from the first preceding corresponding point to present corresponding point, the sum of said weight along the matching path being dependent only on the length of the pattern; and a fifth step for determining a reference pattern sequence corresponding to the input pattern in a reverse order to the input using said back pointer B(i) and the rearmost reference pattern name N(i); characterized in that said fourth step comprises steps of:
  (1) obtaining only one path by minimizing as to m, the sum of said weight along the matching path being dependent only on the length of the reference pattern,
  (2) normalizing the sum of the products of said frame-to-frame distance and weight by the sum of said weight along the matching path, and
  (3) calculating the local cumulative distance for a plurality of local input patterns having different frame lengths by multiplying said normalized sum of the products of said frame-to-frame distance and weight by a first frame number of said local input pattern and by a second frame number obtained by adding a number to or by subtracting a number from said first frame number.

3. A pattern comparing method comprising;

a first step for converting each of input signals to an input pattern comprising a series of feature vectors, each input feature vector being produced at every frames each of which corresponds to a constant time unit of the input signal;

a second step for calculating a vector-to-vector distance as a frame-to-frame distance between a frame of said input pattern and a frame of a reference pattern, said vector-to-vector distance indicating the degree of similarity between the input feature vector of the ith frame of each input pattern and a feature vector of the jth frame of said reference pattern;

a third step for calculating $$D(i) = \min_{m,n}[D(m) + D^n(m + 1:i)]$$

regarding i=1 to I where D(0)=0, and memorizing m as a back pointer B(i) and n as the rearmost reference pattern name N(i) when each D(i) is calculated, where, D(i) represents the sum of frame-to-frame distance between the local pattern of the first to the ith frames of the input pattern and a reference pattern or a combination pattern of a plurality of reference patterns, D(m) represents the sum of frame-to-frame distance between the local pattern of the first to the mth (m<i) frames of the input pattern and a reference pattern or a combination pattern of a plurality of reference patterns, $D^n(m+1;i)$ represents a local cumulative distance which is a pattern-to-pattern distance between the local pattern of m+1 to ith frames of the input pattern and the nth reference pattern, and n represents a number given to said reference pattern;

a fourth step for calculating said local cumulative distance $D^n(m+1;i)$ by calculating by a dynamic programming method on an i-j plane whose abscissa is the frame numbers i of the input pattern and whose ordinate is the frame number of the reference pattern, a matching path whose starting point is (m+1,1) determined with respect of i and terminating point is (i, $J^n$), in which the sum of the product of said frame-to-frame distance and weight along said path is minimum, and memorizing said sum of the product of said frame-to-frame distance and weight with respect of said m, where $J^n$ represents frame number of reference pattern n, said matching path represents a path connecting corresponding points, said corresponding point represents a point for indicating which frame-to-frame distance between the input pattern and the standard pattern should be calculated, and said weight depends on the types of the path from the first preceding corresponding point to present corresponding point, the sum of said weight along the matching path being dependent only on the length of the pattern; and a fifth step for determining a reference pattern sequence corresponding to the input pattern in a reverse order to the input using said back pointer B(i) and the rearmost reference pattern name N(i);

characterized in that said fourth step comprises steps of:

(1) obtaining by a dynamic programming method a plurality of matching paths in which the sum of the product of said frame-to-frame distance and weight is close to minimum, the sum of said weight along the matching path being dependent only on the length of the reference pattern, (2) normalizing the sum of the products of said frame-to-frame distance and weight by the sum of said weight along the matching path, and (3) calculating the local cumulative distance for a plurality of local input patterns having different frame lengths by multiplying said normalized sum of the products of said frame-to-frame distance and weight by a first frame number of said local input pattern and by a second frame number obtained by adding a number to or by subtracting a number from said first frame number.

4. A pattern comparing method comprising;

a first step for converting each of input signals to an input pattern comprising a series of feature vectors, each input feature vector being produced at every frames each of which corresponds to a constant time unit of the input signal;

a second step for calculating a vector-to-vector distance as a frame-to-frame distance between a frame of said input pattern and a frame of a reference pattern, said vector-to-vector distance indicating the degree of similarity between the input feature vector of the ith frame of each input pattern and a feature vector of the jth frame of said reference pattern;

a third step for calculating $$D_x(i) = \min_{m,n}[D_{x-1}(m) + D^n(m + 1:i)]$$

regarding i=1 to I where $D_0(0)=0$, and memorizing m as a back pointer $B_x(i)$ and n as the rearmost reference pattern name $N_x(i)$ when each $D_x(i)$ is calculated, where, $D_x(i)$ represents the sum of frame-to-frame distance between the local pattern of the first to the ith frames of the input pattern and a reference pattern or a combination pattern of reference patterns, the number of said reference pattern being x, $D_{x-1}(m)$ represents the sum of frame-to-frame distance between the local pattern of the first to the mth (m<i) frames of the input pattern and a reference pattern or a combination pattern of reference patterns, the number of said reference pattern being x−1, $D^n(m+1;i)$ represents a local cumulative distance which is a pattern-to-pattern distance between the local pattern of m+1 to ith frames of the input pattern and the nth reference pattern, and n represents a number given to said reference pattern;

a fourth step for calculating said local cumulative distance $D^n(m+1:i)$ by calculating by a dynamic programming method on an i-j plane whose abscissa is the frame numbers i of the input pattern and whose ordinate is the frame number of the reference pattern, a matching path whose starting point is (m+1,1) determined with respect of i and terminating point is (i,$J^n$), in which the sum of the product of said frame-to-frame distance and weight along said path is minimum, and memorizing said sum of the product of said frame-to-frame distance and weight with respect of said m, where $J^n$ represents frame number of reference pattern n, said matching path represents a path connecting corresponding points, said corresponding point represents a point for indicating which frame-to-frame distance between the input pattern and the standard pattern should be calculated, and said weight depends on the types of the path from the first preceding corresponding point to present corresponding point, the sum of said weight along the matching path being dependent only on the length of the pattern; and a fifth step for determining a reference pattern sequence corresponding to the input pattern in a reverse order to the input using said back pointer $B_x(i)$ and the rearmost reference pattern name $N_x(i)$;

characterized in that said fourth step comprises step of:

(1) obtaining only one path by minimizing as to m, the sum of said weight along the matching path being dependent only on the length of the reference pattern, (2) normalizing the sum of the products of said frame-to-frame distance and weight by the sum of said weight along the matching path, and (3) calculating the local cumulative distance for a plurality of local input patterns having different frame lengths by multiplying said normalized sum of the products of said frame-to-frame distance and weight by a first frame number of said local input pattern and by a second frame number obtained by adding a number to or by subtracting a number from said first frame number.

5. A pattern comparing method comprising:

a first step for converting each of input signals to an input pattern comprising a series of feature vectors, each input feature vector being produced at every frames each of which corresponds to a constant time unit of the input signal;

a second step for calculating a vector-to-vector distance as a frame-to-frame distance between a frame of said input pattern and a frame of a reference pattern, said vector-to-vector distance indicating the degree of similarity between the input feature vector of the ith frame of each input pattern and a feature vector of the jth frame of said reference pattern;

a third step for calculating $$D_x(i) = \min_{m,n}[D_{x-1}(m) + D^n(m + 1:i)]$$

regarding i=1 to I where $D_0(0)=0$, and memorizing m as a back pointer $B_x(i)$ and n as the rearmost reference pattern name $N_x(i)$ when each $D_x(i)$ is calculated, where, $D_x(i)$ represents the sum of frame-to-frame distance between the local pattern of the first to the ith frames of the input pattern and a reference pattern or a combination pattern or reference patterns, the number of said reference pattern being x, $D_{x-1}(m)$ represents the sum of frame-to-frame distance between the local pattern of the first to the mth (m<i) frames of the input pattern and a reference pattern or a combination pattern of reference patterns, the number of said reference pattern being x−1, $D^n(m+1;i)$ represents a local cumulative distance which is a pattern-to-pattern distance between the local pattern of m+1b 1;i) represents a local cumulative distance which is a pattern-to-pattern distance between the local pattern of m+1 to ith frames of the input pattern and the nth reference pattern, and n represents a number given to said reference pattern;

a fourth step for calculating said local cumulative distance $D^n(m+1:i)$ by calculating by a dynamic programming method on an i-j plane whose abscissa is the frame numbers i of the input pattern and whose ordinate is the frame number of the reference pattern, a matching path whose starting point is (m+1,1) determined with respect of i and terminating point is $(i,J^n)$, in which the sum of the product of said frame-to-frame distance and weight along said path is minimum, and memorizing said sum of the product of said frame-to-frame distance and weight with respect of said m, where $J^n$ represents frame number of reference pattern n, said matching path represents a path connecting corresponding points, said corresponding point represents a point for indicating which frame-to-frame distance between the input pattern and the standard pattern should be calculated, and said weight depends on the types of the path from the first preceding corresponding point to present corresponding point, the sum of said weight along the matching path being dependent only on the length of the pattern; and a fifth step for determining a reference pattern sequence corresponding to the input pattern in a reverse order to the input using said back pointer $B_x(i)$ and the rearmost reference pattern name $N_x(i)$;

characterized in that said fourth step comprises steps of:

(1) obtaining by a dynamic programming method a plurality of matching paths in which the sum of the product of said frame-to-frame distance and weight is close to minimum, the sum of said weight along the matching path being dependent only on the length of the reference pattern, (2) normalizing the sum of the products of said frame-to-frame distance and weight by the sum of said weight along the matching path, and (3) calculating the local cumulative distance for a plurality of local input patterns having different frame lengths by multiplying said normalized sum of the products of said frame-to-frame distance and weight by a first frame number of said local input pattern and by a second frame number obtained by adding a number to or by subtracting a number from said first frame number.

6. A pattern comparing method comprising;

a first step for converting each of input signals to an input pattern comprising a series of feature vectors, each input feature vector being produced at every frames each of which corresponds to a constant time unit of the input signal;

a second step for calculating a vector-to-vector distance as a frame-to-frame distance between a frame of said input pattern and a frame of a reference pattern, said vector-to-vector distance indicating the degree of similarity between the input feature vector of the ith frame of each input pattern and a feature vector of the jth frame of said reference pattern;

a third step for calculating $$D_q(i) = \min_{m,n,p} [D_p(m) + D^n(m + 1{:}i)]$$

i=1 to I where $D_0(0)=0$, and memorizing m as a back pointer $B_q(i)$ for the frame, n as the rearmost reference pattern name $N_q(i)$ and q as a back pointer $Q_q(i)$ for a state when each $D_q(i)$ is calculated, where $D_q(i)$ represents the sum of frame-to-frame distance between the local pattern of the first to the ith frames of the input pattern and a combination pattern of reference patterns when the rearmost reference pattern is outputted and transmitted to a state q, $D_p(m)$ represents the sum of frame-to-frame distance between the local pattern of the first to the mth (m<i) frames of the input pattern and a combination pattern of reference patterns when the rearmost reference pattern is outputted and transmitted to the state q, $D^n(m+1;i)$ represents a local cumulative distance which is a pattern-to-pattern distance between the local pattern of m+1 to ith frames of the input pattern and the nth reference pattern, and n represents a number given to said reference pattern;

a fourth step for calculating said local cumulative distance $D^n(m+1{:}i)$ by calculating by a dynamic programming method on an i-j plane whose abscissa is the frame numbers i of the input pattern and whose ordinate is the frame number of the reference pattern, a matching path whose starting point is (m+1,1) determined with respect of i and terminating point is $(i, J^n)$, in which the sum of the product of said frame-to-frame distance and weight along said path is minimum, and memorizing said sum of the product of said frame-to-frame distance and weight with respect of said m, where $J^n$ represents frame number of reference pattern n, said matching path represents a path connecting corresponding points, said corresponding point represents a point for indicating which frame-to-frame distance between the input pattern and the standard pattern should be calculated, and said weight depends on the types of the path from the first preceding corresponding point to present corresponding point, the sum of said weight along the matching path being dependent only on the length of the pattern; and a fifth step for determining a reference pattern sequence corresponding to the input pattern in a reverse order to the input using said back pointers $B_q(i)$ and $Q_q(i)$ and the rearmost reference pattern name $N_q(i)$;

characterized in that said fourth step comprises steps of:

(1) obtaining only one path by minimizing as to m, the sum of said weight along the matching path being dependent only on the length of the reference pattern, (2) normalizing the sum of the products of said frame-to-frame distance and weight by the sum of said weight along the matching path, and (3) calculating the local cumulative distance for a plurality of local input patterns having different frame lengths by multiplying said normalized sum of the products of said frame-to-frame distance and weight by a first frame number of said local input pattern and by a second frame number obtained by adding a number to or by subtracting a number from said first frame number.

7. A pattern comparing method comprising;

a first step for converting each of input signals to an input pattern comprising a series of feature vectors, each input feature vector being produced at every frames each of which corresponds to a constant time unit of the input signal;

a second step for calculating a vector-to-vector distance as a frame-to-frame distance between a frame of said input pattern and a frame of a reference pattern, said vector-to-vector distance indicating the degree of similarity between the input feature vector of the ith frame of each input pattern and a feature vector of the jth frame of said reference pattern;

a third step for calculating $$D_q(i) = \min_{m,n,p} [D_p(m) + D^n(m + 1{:}i)]$$

regarding i=1 to I where $D_0(0)=0$, and memorizing m as a back pointer $B_q(i)$ for the frame, n as the rearmost reference pattern name $N_q(i)$ and q as a back pointer $Q_q(i)$ for a state when each $D_q(i)$ is calculated, where, $D_q(i)$ represents the sum of frame-to-frame distance between the local pattern of the first to the ith frames of the input pattern and a combination pattern of reference patterns when the rearmost reference pattern is outputted and transmitted to a state q, $D_p(m)$ represents the sum of frame-to-frame distance between the local pattern of the first to the mth (m<i) frames of the input pattern and a combination pattern of reference patterns when the rearmost reference pattern is outputted and transmitted to the state q, $D^n(m+1;i)$ represents a local cumulative distance which is a pattern-to-pattern distance between the local pattern of m+1 to ith frames of the input pattern and the nth reference pattern, and n represents a number given to said reference pattern;

a fourth step for calculating said local cumulative distance $D^n(m+1;i)$ by calculating by a dynamic programming method on an i-j plane whose abscissa is the frame numbers i of the input pattern and whose ordinate is the frame number of the reference pattern, a matching path whose starting point is (m+1,1) determined with respect of i and terminating point is $(i,J^n)$, in which the sum of the product of said frame-to-frame distance and weight along said path is minimum, and memorizing said sum of the product of said frame-to-frame distance and weight with respect of said m, where $J^n$ represents frame number of reference pattern n, said matching path represents a path connecting corresponding points, said corresponding point represents a point for indicating which frame-to-frame distance between the input pattern and the reference pattern should be calculated, and said weight depends on the types of the path from the first preceding corresponding point to present corresponding point, the sum of said weight along the matching path being dependent only on the length of the pattern; and a fifth step for determining a reference pattern sequence corresponding to the input pattern in a reverse order to the input using said back pointers $B_q(i)$ and $Q_q(i)$ and the rearmost reference pattern name $N_q(i)$;

characterized in that said fourth step comprises steps of:

(1) obtaining by a dynamic programming method a plurality of matching paths in which the sum of the product of said frame-to-frame distance and weight is close to minimum, the sum of said weight along the matching path being dependent only on the length of the reference pattern, (2) means for normalizing the sum of the products of said frame-to-frame distance and weight by the sum of said weight along the matching path, and (3) calculating the local cumulative distance for a plurality of local input patterns having different frame lengths by multiplying said normalized sum of the products of said frame-to-frame distance and weight by a first frame number of said local input pattern and by a second frame number obtained by adding a number to or by subtracting a number from said first frame number.

* * * * *